United States Patent
Dzik

(10) Patent No.: US 9,223,830 B1
(45) Date of Patent: Dec. 29, 2015

(54) CONTENT PRESENTATION ANALYSIS

(71) Applicant: Audible, Inc., Newark, NJ (US)

(72) Inventor: Steven Charles Dzik, Somerset, NJ (US)

(73) Assignee: Audible, Inc., Newark, NJ (US)

( * ) Notice: Subject to any disclaimer, the term of this patent is extended or adjusted under 35 U.S.C. 154(b) by 511 days.

(21) Appl. No.: 13/662,306

(22) Filed: Oct. 26, 2012

(51) Int. Cl.
*G06F 3/048* (2013.01)
*G06F 17/30* (2006.01)
*G06F 3/00* (2006.01)

(52) U.S. Cl.
CPC ...... *G06F 17/3053* (2013.01); *G06F 17/30867* (2013.01)

(58) Field of Classification Search
CPC .......... G06F 17/3028; G06F 17/30867; G06F 17/3053
See application file for complete search history.

(56) References Cited

U.S. PATENT DOCUMENTS

| | | | |
|---|---|---|---|
| 5,203,705 A | 4/1993 | Hardy et al. | |
| 5,351,189 A | 9/1994 | Doi et al. | |
| 5,657,426 A | 8/1997 | Waters et al. | |
| 5,737,489 A | 4/1998 | Chou et al. | |
| 5,877,766 A * | 3/1999 | Bates et al. | 715/854 |
| 5,978,754 A | 11/1999 | Kumano | |
| 6,076,059 A | 6/2000 | Glickman et al. | |
| 6,208,956 B1 | 3/2001 | Motoyama | |
| 6,256,610 B1 | 7/2001 | Baum | |
| 6,260,011 B1 | 7/2001 | Heckerman et al. | |
| 6,356,922 B1 | 3/2002 | Schilit et al. | |
| 6,766,294 B2 | 7/2004 | MacGinite et al. | |
| 6,912,505 B2 | 6/2005 | Linden et al. | |
| 7,003,515 B1 | 2/2006 | Glaser et al. | |
| 7,107,533 B2 | 9/2006 | Duncan et al. | |
| 7,231,351 B1 | 6/2007 | Griggs | |
| 7,840,912 B2 * | 11/2010 | Elias et al. | 715/863 |
| 7,877,705 B2 * | 1/2011 | Chambers et al. | 715/835 |
| 7,937,380 B2 * | 5/2011 | Spiegelman et al. | 707/705 |
| 8,106,285 B2 | 1/2012 | Gerl et al. | |
| 8,109,765 B2 | 2/2012 | Beattie et al. | |
| 8,131,545 B1 | 3/2012 | Moreno et al. | |
| 8,131,865 B2 | 3/2012 | Rebaud et al. | |
| 8,442,423 B1 | 5/2013 | Ryan et al. | |
| 8,527,272 B2 | 9/2013 | Qin et al. | |

(Continued)

FOREIGN PATENT DOCUMENTS

| | | |
|---|---|---|
| CN | 103988193 A | 8/2014 |
| EP | 2689346 | 1/2014 |

(Continued)

OTHER PUBLICATIONS

Arar, Y., Blio E-Book Platform: No Reader (Yet), But Great Graphics, Jan. 7, 2010.

(Continued)

*Primary Examiner* — Nicholas Augustine
(74) *Attorney, Agent, or Firm* — Knobbe, Martens, Olson & Bear, LLP

(57) ABSTRACT

A presentation analysis service may obtain presentation information from one or more computing devices that are presenting the item of content. The presentation information may be used to generate recommendations to be provided to a user that is consuming the item of content and/or to a provider of items of content. Further, the presentation information may be used to adapt a presentation of the item of content.

34 Claims, 11 Drawing Sheets

(56) References Cited

U.S. PATENT DOCUMENTS

| | | | |
|---|---|---|---|
| 8,548,618 B1 | 10/2013 | Story, Jr. et al. | |
| 8,577,668 B2 | 11/2013 | Rosart et al. | |
| 8,855,797 B2 | 10/2014 | Story, Jr. et al. | |
| 8,862,255 B2 | 10/2014 | Story, Jr. et al. | |
| 8,948,892 B2 | 2/2015 | Story, Jr. et al. | |
| 9,037,956 B2 | 5/2015 | Goldstein et al. | |
| 2002/0002459 A1 | 1/2002 | Lewis et al. | |
| 2002/0007349 A1 | 1/2002 | Yuen | |
| 2002/0041692 A1 | 4/2002 | Seto et al. | |
| 2002/0116188 A1 | 8/2002 | Amir et al. | |
| 2002/0184189 A1 | 12/2002 | Hay et al. | |
| 2003/0061028 A1 | 3/2003 | Dey et al. | |
| 2003/0083885 A1 | 5/2003 | Frimpong-Ansah | |
| 2003/0115289 A1 | 6/2003 | Chinn et al. | |
| 2003/0158855 A1* | 8/2003 | Farnham et al. | 707/102 |
| 2004/0003042 A1* | 1/2004 | Horvitz et al. | 709/204 |
| 2004/0261093 A1 | 12/2004 | Rebaud et al. | |
| 2005/0022113 A1 | 1/2005 | Hanlon | |
| 2006/0148569 A1 | 7/2006 | Beck | |
| 2007/0016314 A1 | 1/2007 | Chan et al. | |
| 2007/0061487 A1 | 3/2007 | Moore et al. | |
| 2007/0136459 A1 | 6/2007 | Roche et al. | |
| 2007/0276657 A1 | 11/2007 | Gournay et al. | |
| 2007/0282844 A1 | 12/2007 | Kim et al. | |
| 2008/0005656 A1 | 1/2008 | Pang et al. | |
| 2008/0027726 A1 | 1/2008 | Hansen et al. | |
| 2008/0177822 A1 | 7/2008 | Yoneda | |
| 2008/0294453 A1 | 11/2008 | Baird-Smith et al. | |
| 2009/0047003 A1 | 2/2009 | Yamamoto | |
| 2009/0136213 A1 | 5/2009 | Calisa et al. | |
| 2009/0210213 A1 | 8/2009 | Cannon et al. | |
| 2009/0222520 A1 | 9/2009 | Sloo et al. | |
| 2009/0228570 A1 | 9/2009 | Janik et al. | |
| 2009/0233705 A1 | 9/2009 | Lemay et al. | |
| 2009/0276215 A1 | 11/2009 | Hager | |
| 2009/0281645 A1 | 11/2009 | Kitahara et al. | |
| 2009/0305203 A1 | 12/2009 | Okumura et al. | |
| 2009/0319181 A1* | 12/2009 | Khosravy et al. | 701/208 |
| 2009/0319273 A1 | 12/2009 | Mitsui et al. | |
| 2010/0042682 A1 | 2/2010 | Kaye | |
| 2010/0042702 A1 | 2/2010 | Hanses | |
| 2010/0064218 A1 | 3/2010 | Bull et al. | |
| 2010/0070575 A1 | 3/2010 | Bergquist et al. | |
| 2010/0122174 A1* | 5/2010 | Snibbe et al. | 715/733 |
| 2010/0225809 A1 | 9/2010 | Connors et al. | |
| 2010/0279822 A1 | 11/2010 | Ford | |
| 2010/0286979 A1 | 11/2010 | Zangvil et al. | |
| 2010/0287256 A1 | 11/2010 | Neilio | |
| 2011/0067082 A1 | 3/2011 | Walker | |
| 2011/0087802 A1 | 4/2011 | Witriol et al. | |
| 2011/0119572 A1 | 5/2011 | Jang et al. | |
| 2011/0145275 A1* | 6/2011 | Stewart | 707/769 |
| 2011/0153330 A1 | 6/2011 | Yazdani et al. | |
| 2011/0164058 A1* | 7/2011 | Lemay | 345/651 |
| 2011/0177481 A1 | 7/2011 | Haff et al. | |
| 2011/0184738 A1 | 7/2011 | Kalisky et al. | |
| 2011/0191105 A1 | 8/2011 | Spears | |
| 2011/0231474 A1 | 9/2011 | Locker et al. | |
| 2011/0246175 A1 | 10/2011 | Yi et al. | |
| 2011/0288861 A1 | 11/2011 | Kurzweil et al. | |
| 2011/0288862 A1 | 11/2011 | Todic | |
| 2011/0296287 A1 | 12/2011 | Shahraray et al. | |
| 2011/0320189 A1 | 12/2011 | Carus et al. | |
| 2012/0030288 A1 | 2/2012 | Burckart et al. | |
| 2012/0109640 A1 | 5/2012 | Anisimovich et al. | |
| 2012/0150935 A1 | 6/2012 | Frick et al. | |
| 2012/0158706 A1 | 6/2012 | Story, Jr. et al. | |
| 2012/0166180 A1 | 6/2012 | Au | |
| 2012/0197998 A1 | 8/2012 | Kessel et al. | |
| 2012/0245719 A1 | 9/2012 | Story, Jr. et al. | |
| 2012/0245720 A1 | 9/2012 | Story, Jr. et al. | |
| 2012/0245721 A1 | 9/2012 | Story, Jr. et al. | |
| 2012/0246343 A1 | 9/2012 | Story, Jr. et al. | |
| 2012/0310642 A1 | 12/2012 | Cao et al. | |
| 2012/0315009 A1 | 12/2012 | Evans et al. | |
| 2012/0324324 A1 | 12/2012 | Hwang et al. | |
| 2013/0041747 A1 | 2/2013 | Anderson et al. | |
| 2013/0073449 A1 | 3/2013 | Voynow et al. | |
| 2013/0073675 A1 | 3/2013 | Hwang et al. | |
| 2013/0074133 A1 | 3/2013 | Hwang et al. | |
| 2013/0130216 A1 | 5/2013 | Morton et al. | |
| 2013/0212454 A1 | 8/2013 | Casey | |
| 2013/0257871 A1 | 10/2013 | Goldstein, at al. | |
| 2013/0262127 A1 | 10/2013 | Goldstein et al. | |
| 2014/0005814 A1 | 1/2014 | Hwang et al. | |
| 2014/0039887 A1 | 1/2014 | Dzik et al. | |
| 2014/0040713 A1 | 2/2014 | Dzik et al. | |
| 2014/0223272 A1 | 8/2014 | Arora et al. | |
| 2014/0250219 A1 | 9/2014 | Hwang | |
| 2015/0026577 A1 | 1/2015 | Story et al. | |

FOREIGN PATENT DOCUMENTS

| | | |
|---|---|---|
| JP | 9-265299 | 10/1997 |
| JP | 2002-140085 | 5/2002 |
| JP | 2002-328949 | 11/2002 |
| JP | 2003-304511 | 10/2003 |
| JP | 2004-029324 | 1/2004 |
| JP | 2004-117618 | 4/2004 |
| JP | 2004-266576 | 9/2004 |
| JP | 2005-189454 | 7/2005 |
| JP | 2007-522591 | 8/2007 |
| JP | 2007-249703 | 9/2007 |
| JP | 2010-250023 | 11/2010 |
| NZ | 532174 | 11/2012 |
| WO | WO 2006/029458 A1 | 3/2006 |
| WO | WO 2011/144617 A1 | 11/2011 |
| WO | WO 2012/129438 | 9/2012 |
| WO | WO 2012/129445 | 9/2012 |
| WO | WO 2013/148724 | 10/2013 |
| WO | WO 2013/169670 | 11/2013 |
| WO | WO 2013/181158 | 12/2013 |
| WO | WO 2013/192050 | 12/2013 |
| WO | WO 2014/004658 | 1/2014 |

OTHER PUBLICATIONS

Beattie, V., et al., Reading Assistant: Technology for Guided Oral Reading, Scientific Learning, Apr. 10, 2012, 5 pages.

Dzik, S.C., U.S. Appl. No. 13/604,482, filed Sep. 5, 2012, entitled Identifying Corresponding Regions of Content.

Dzik, S.C., U.S. Appl. No. 13/604,486, filed Sep. 5, 2012, entitled Selecting Content Portions for Alignment.

Hwang, D.C., et al., U.S. Appl. No. 13/536,711, filed Jun. 28, 2012, entitled Pacing Content.

International Search Report issued in connection with International Patent Application No. PCTUS12/30186 mailed on Jun. 20, 2012, 12 pages.

International Search Report issued in connection with International Patent Application No. PCT/US12/30198 mailed on Jun. 20, 2012, 16 pages.

International Search Report and Written Opinion in PCT/US2013/042903 mailed Feb. 7, 2014.

International Search Report issued in connection with International Application No. PCT/US13/53020 mailed on Dec. 16, 2013.

Levinson, S.E., et al., Continuous Speech Recognition from a Phonetic Transcription, Acoustics, Speech, and Signal Processing, Apr. 1990, pp. 190-199.

Vignoli, F., et al., A Text-Speech Synchronization Technique With Applications to Talking Heads, Auditory-Visual Speech Processing, ISCA Archive, Aug. 7-10, 1999.

Weber, F.V., U.S. Appl. No. 13/531,376, filed Jun. 22, 2012, entitled Modelling Expected Errors for Discriminative Training.

International Preliminary Report on Patentability issued in connection with International Patent Application No. PCT/US12/30198 mailed on Jan. 30, 2014, 8 pages.

Office Action Japanese Application No. 2014-501257 dated Aug. 25, 2014.

International Search Report and Written Opinion in PCT/US2014/014508 mailed Jun. 25, 2014.

(56) References Cited

OTHER PUBLICATIONS

Story Jr. et al., U.S. Appl. No. 12/881,021, filed Sep. 13, 2010, entitled "Systems and Methods for Associating Stories with Related Referents".
Roub, Paul, "I'll Buy an E-book Reader When . . . ", Nov. 16, 2007, available at: http://roub.net/blahg/2007/11/16/ill-buy-an-eboo/ (accessed: Sep. 6, 2012), 2 pages.
Enhanced Editions, "Feature: Synched Audio and Text" Aug. 31, 2009, last accessed Nov. 15, 2012, available at http://www.enhanced-editions.com/blog/2009/08/enhanced-editions-features-exclusive-soundtracks-and-extracts/.
Extended Search Report in European Application No. (12761404.8) dated Jan. 26, 2015.
International Preliminary Report issued in connection with International Application No. PCT/US13/53020 mailed on Feb. 12, 2015.
Office Action in Japanese Application No. 2014-501254 dated Oct. 14, 2014.
International Preliminary Report on Patentability in PCT/US2013/042903 mailed Dec. 2, 2014.
Extended Search Report in European Application No. 12761104.4 dated Apr. 20, 2015.
Office Action in Canadian Application No. 2830906 dated Mar. 17, 2015.
Office Action in Japanese Application No. 2014-501257 dated Apr. 6, 2015.
Office Action in Canadian Application No. 2830622 dated Jun. 10, 2015.

* cited by examiner

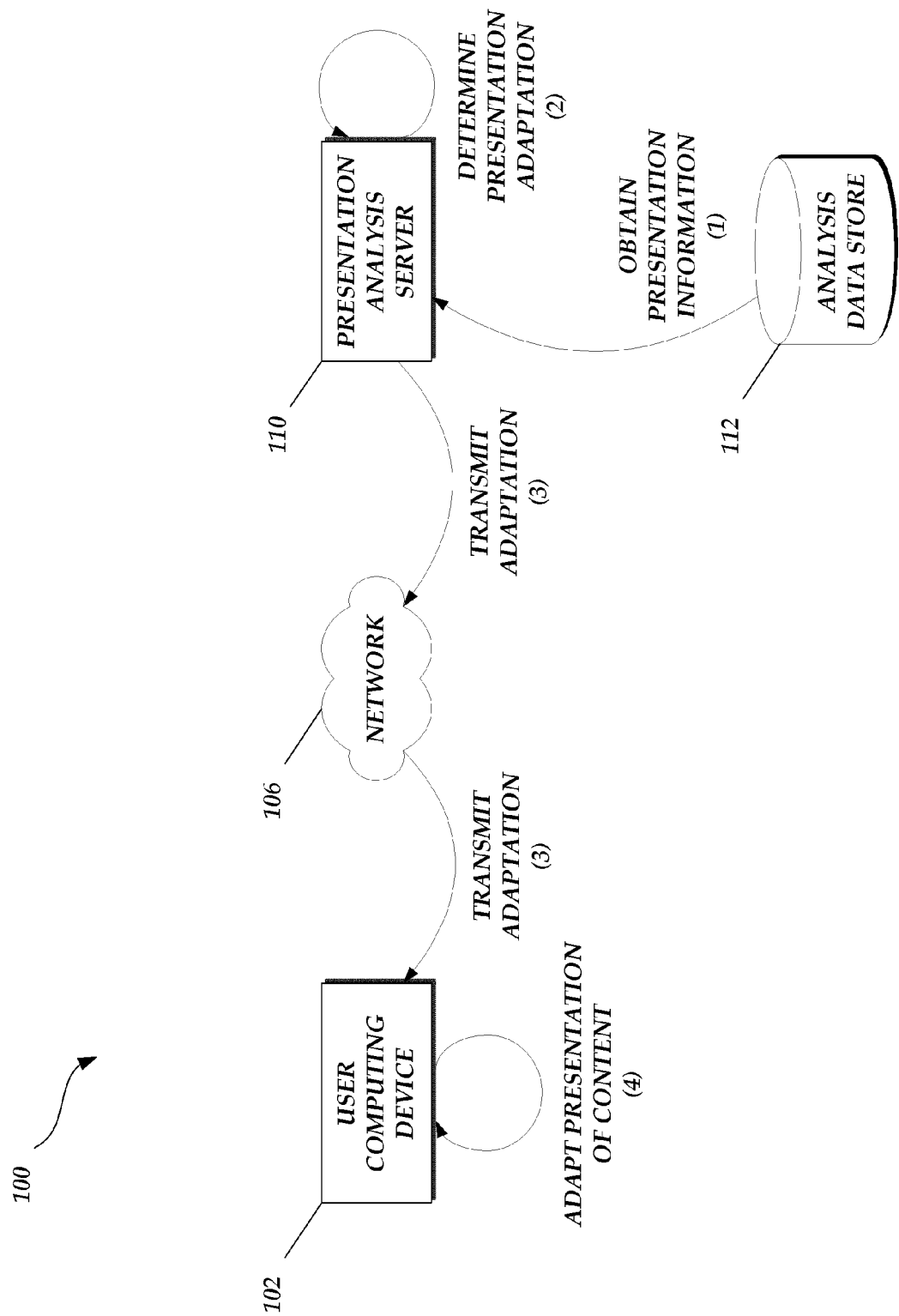

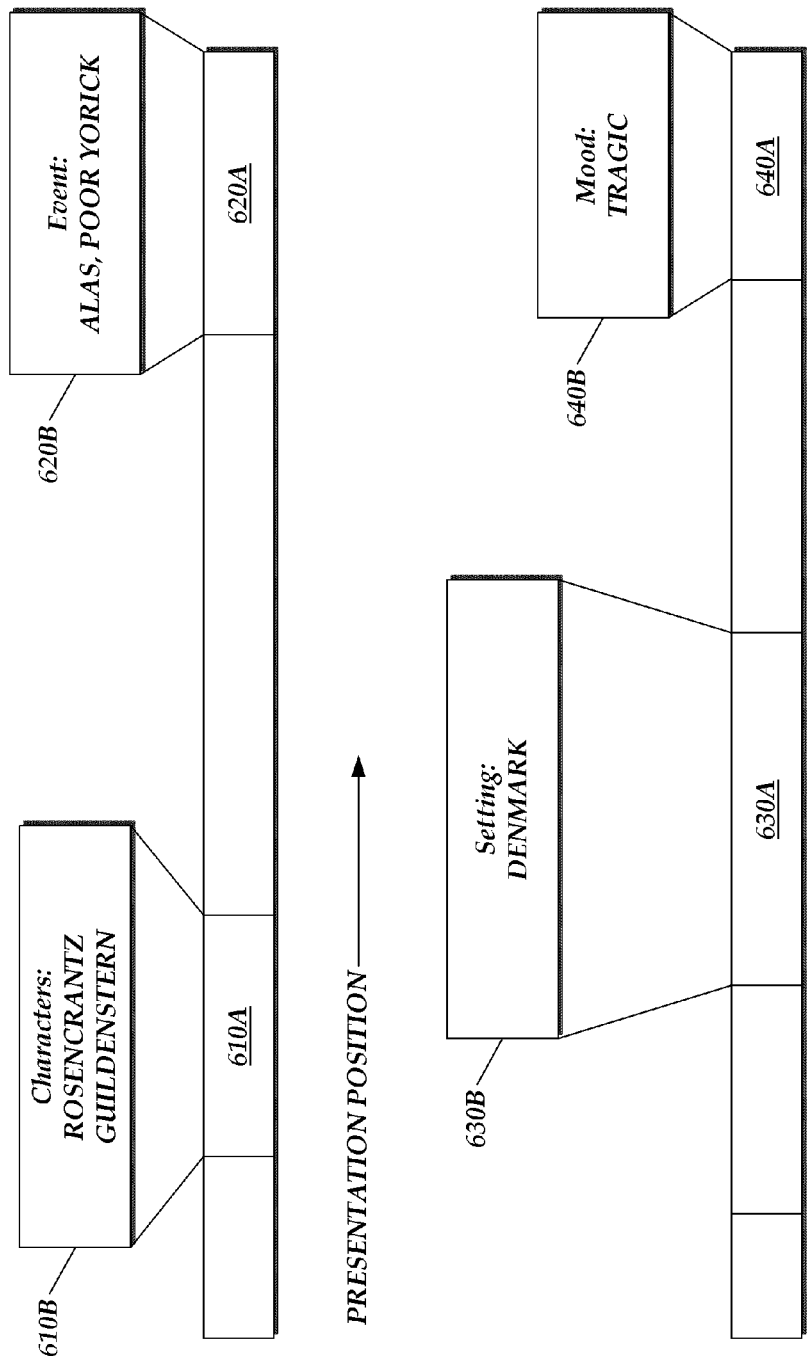

CONTENT PRESENTATION ANALYSIS

BACKGROUND

Generally described, computing devices may present items of digital content to users. For example, computing devices may visually present items of content such as electronic books, periodicals, animations, movies, television programs, videos, multi-media content and portions thereof on an electronic screen or touchscreen. Computing devices may also direct audible output through headphones or speakers to audibly present content included audiobooks, songs, movies, television programs, videos, multi-media content and portions thereof.

BRIEF DESCRIPTION OF THE DRAWINGS

The foregoing aspects and many of the attendant advantages will become more readily appreciated as the same become better understood by reference to the following detailed description when taken in conjunction with the accompanying drawings, wherein:

FIG. 5 is a state diagram of an illustrative operation for adapting the presentation of content.

FIG. 6A and FIG. 6B are structure diagrams depicting presentation positions for example content elements and other characteristics that may be associated with a presentation position in an item of content.

DETAILED DESCRIPTION

Figure 1:
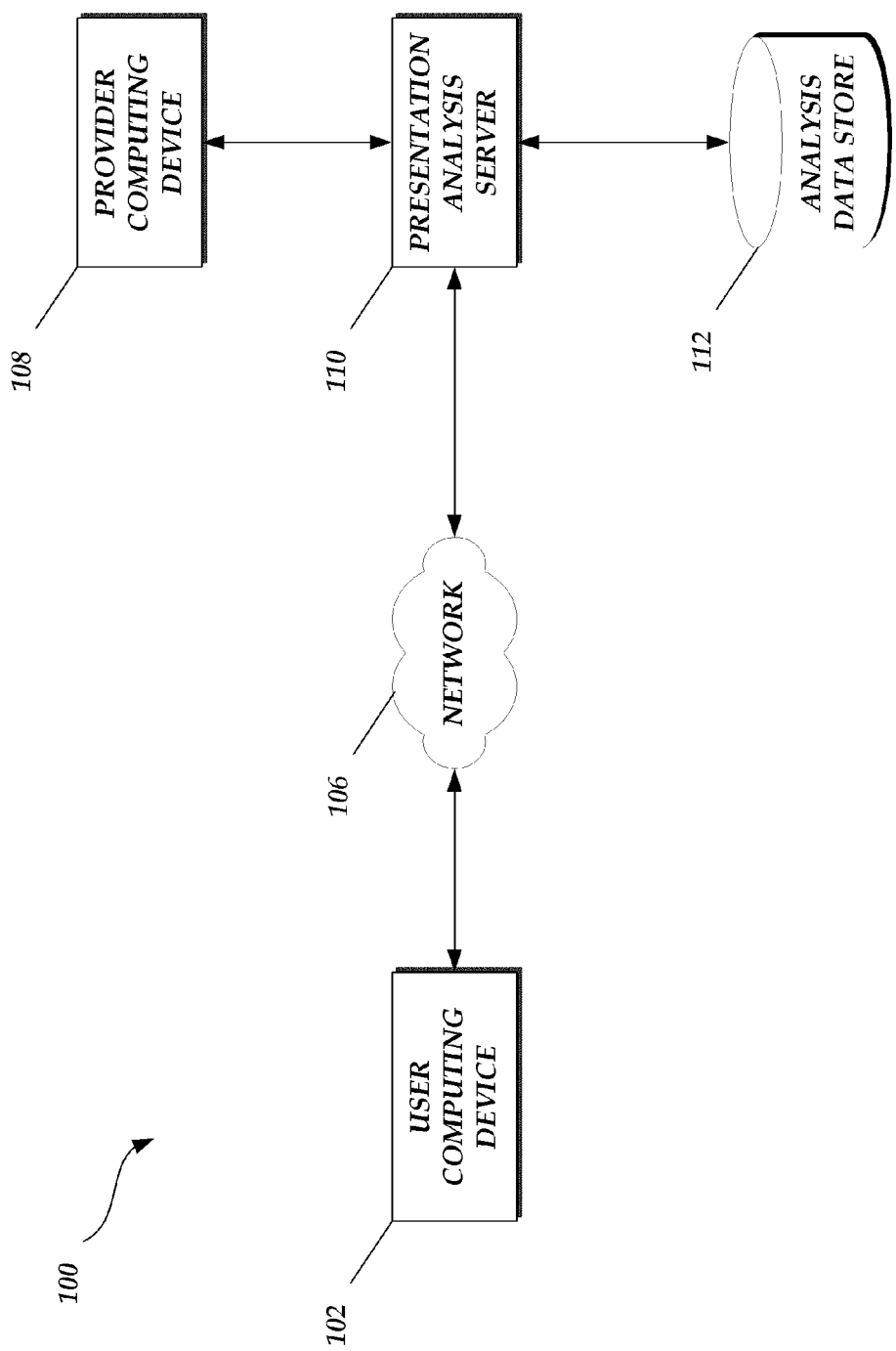
FIG. 1 is a schematic block diagram depicting an illustrative network environment in which a presentation analysis service is implemented.

A user of a computing device presenting an item of content may consume the item of content in different ways. For example, the user may consume the item of content from start to finish over one continuous time period, or the user may consume the item of content over several time periods. The user may skip around in the item of content, for example, to consume parts of the item of content that are of particular interest to the user, or to avoid parts of the item of content that the user may not enjoy or may find too difficult.

Providers of items of content may be interested in determining how users consume items of content so that they may produce or offer content that corresponds to users' preferences. However, current approaches to determine users' preferences for consuming content are limited in several respects. For example, many current approaches rely on subjective user reviews of an entire item of content. These reviews may difficult, time-consuming, and expensive to compile and analyze. Moreover, these reviews may be biased, falsified, or otherwise inaccurate, and even may be provided by users who did not actually consume the item of content. Accordingly, the providers of content may have limited or inaccurate information on how users are actually consuming content. Still other problems are present in current approaches.

Generally described, aspects of the present disclosure are directed to analyzing how users consume items of content. Accordingly, a presentation analysis service is disclosed. In one embodiment, the presentation analysis service may acquire presentation information from a computing device that is presenting an item of content. This presentation information may describe how the user has consumed an item of content, as may be determined by the presentation position of the item of content measured over time. For example, the presentation analysis service may determine which pages of an electronic book a user has read since acquiring the electronic book, as well as the time it took the user to read those pages. Based on the measured presentation position of the item of content, the presentation analysis service may adapt how the content is presented (e.g., by removing coarse language or by providing supplemental content, among other examples), or may provide recommendations to the user for further items of content in which the user may be interested.

Further, the presentation analysis service may aggregate presentation information for an item of content that is obtained from computing devices that are presenting the item of content. The aggregate presentation information may be provided to a provider of items of content, such as an author, producer, publisher, retailer, library, repository, etc. The provider may be affiliated with a network-based service. This aggregate presentation information may include presentation information obtained from many user computing devices, and may thus enable content providers to tailor their offerings to match users' preferences as expressed through the users' consumption of content. For example, the presentation analysis service may determine that many users are skipping a particular portion of an electronic book. The presentation analysis service may provide this information to the author of the electronic book so that the author can determine what caused users to skip over that portion of the electronic book, and tailor his or her future works accordingly. The presentation analysis service may also use this aggregated presentation information to recommend adapted presentations of the content to users of the item of content (e.g., recommending supplemental content to a user) based on patterns of use of an item of content by previous users from whom presentation information has been obtained.

In some embodiments, presentation information is analyzed in light of information that relates referents an item of content to a presentation position in the item of content. A referent may correspond to a character, event, setting, object, mood, place, etc. In this regard, information pertaining to how users react to specific referents in an item of content may be determined. The presentation positions of referents in an item of textual content (such as an electronic book or an audiobook) may be identified in a number of ways. For example, natural language techniques, regular expression techniques, content parsing techniques, semantic analysis techniques, syntactic analysis techniques, named entity extraction and other techniques may be used. In other embodiments, referents are located with metadata provided in the item of textual content. In still further embodiments, referents may be located with input from a human interaction task system, a computerized system wherein questions are routed to human volunteers whose answers are provided to the computerized system for further processing. Still other ways of identifying and locating referents in an item of textual content are possible. More information on identifying such content elements may be found in U.S. patent application Ser. No. 13/434,538, entitled "CONTENT CUSTOMIZATION," filed on Mar. 29, 2012; U.S. patent application Ser. No. 13/465,853, entitled "CONTENT CUSTOMIZATION," filed on May 7, 2012; U.S. patent application Ser. No. 12/972,058, entitled "GRAPHICALLY REPRESENTING ASSOCIATIONS BETWEEN REFERENTS AND STORIES," filed on Dec. 17, 2010; and U.S. patent application Ser. No. 12/881,021, entitled "SYSTEMS AND METHODS FOR ASSOCIATING STORIES WITH RELATED REFERENTS." The disclosures of all four of these applications are hereby incorporated by reference in their entireties.

Referents may also be located and mapped to a presentation position in an item of dynamic content, which may include audio or video content that is continuously presented over time. In some embodiments, the presentation analysis service determines the presentation position of these referents by synchronizing the item of dynamic content to a companion item of textual content. Items of content may be "companions" if they relate to the same content title, regardless of a medium in which each item of content is embodied. For example, an audiobook (an example of content embodied audio medium) of the Shakespeare play Hamlet and an electronic book (an example of content embodied in a textual medium) of the Shakespeare play Hamlet may be considered companions. The item of dynamic content and the companion item of textual content may be synchronized, such that one or more words in the item of textual content are mapped to a presentation position in the item of dynamic content (e.g., a time in the item of dynamic content during which the one or more words are audibly or visibly presented). Accordingly, a referent may be identified in the item of textual content and mapped to a corresponding presentation position in the item of dynamic content based on the synchronization between the item of dynamic content and the item of textual content. More information pertaining to synchronizing companion items of textual and dynamic content may be found in U.S. patent application Ser. No. 13/604,482, entitled "IDENTIFYING CORRESPONDING REGIONS OF CONTENT" and filed on Sep. 5, 2012; and in U.S. patent application Ser. No. 13/604,486, entitled "SELECTING CONTENT PORTIONS FOR ALIGNMENT" and filed on Sep. 5, 2012. The disclosures of both of these applications are hereby incorporated by reference in their entireties. Further information pertaining to synchronizing companion items of textual and dynamic content may be found in U.S. patent application Ser. No. 13/070,313, filed on Mar. 23, 2011, entitled "SYNCHRONIZING DIGITAL CONTENT," and in U.S. patent application Ser. No. 12/273,473, filed Nov. 18, 2008, entitled "SYNCHRONIZATION OF DIGITAL CONTENT." The disclosures of both of these applications are hereby incorporated by reference in their entireties. Still other methods of locating referents in an item of content are possible.

Other features may be mapped to presentation positions in an item of content as well. For example, the presentation analysis service may determine a presentation position in an item of content at which coarse language is present, or where an item of content includes narration or text in a particular dialect. The presentation analysis service may also determine a difficulty level of the item of content at a particular presentation position. Still other features may be identified in an item of content as well.

Based on the foregoing, recommendations may be provided to a provider of an item of content or a user of an item of content. In a particular, non-limiting example, the presentation analysis service may determine that many users are skipping over a presentation position in the item of content at which a particular character is present. Accordingly, the presentation analysis service may provide a recommendation to a provider of the item of content indicating that the character is an unpopular character with users. In another example, the presentation analysis service may determine that a particular is skipping to particular presentation positions at which a particular character is present in the item of content. Accordingly, the presentation analysis service may provide a recommendation to the user of the item of content that provides information about other items of content in which the particular character is present. In still another example, the presentation analysis service may determine based on aggregate presentation information that many users are consuming an item of content over relatively long sessions. For example, users of an electronic book may spend a relatively long session reading through the electronic book. The presentation analysis service may present a recommendation to a user or a provider of the item of content indicating that the electronic book is "a real page-turner," as many users may be spending substantial amounts of time in a single session reading the electronic book. Still further types of recommendations are possible.

The presentation information used to generate such recommendations may include presentation information for an entire item of content, or for one or more portions of the item of content. A recommendation pertaining to a portion of an item of content may be generated by identifying a portion of an item of content and analyzing presentation information pertaining specifically to that portion of the item of content. In some embodiments, the portion is identified based on user input (e.g., as may be provided by a user of an item of content or by a provider of items of content). For example, a user of an item of content might identify the portion of the item of content and request that the presentation analysis service provide him or her with a recommendation pertaining to how he or she consumed the portion of the item of content. Alternately, a provider of an item of content may identify a portion of an item of content and request that the presentation analysis service generate and provide a recommendation that is based at least in part on how one or more users have consumed the identified portion of the item of content.

The presentation analysis service may also automatically identify a portion of an item of content whose associated presentation information may be used to generate a recommendation. This automatic identification may be based at least in part on some aspect of the presentation information pertaining to that portion of the item of content. For example, a portion of the item of content may be automatically identified based at least in part on a threshold percentage of users completing the portion of the item of content; a threshold percentage of users skipping the portion of the item of content; referents present in the item of content; the presence of coarse language or dialect in the portion of the item of content; the difficulty of the portion of the item of content, etc. Still other ways are possible for identifying a portion of an item of content whose presentation information may be used to generate a recommendation.

Further, content may be adaptively presented based on presentation information obtained from a user computing device. In some embodiments, an item of content may be adaptively presented by selectively abridging or filtering the item of content. In a particular, non-limiting example, the presentation analysis service may determine that a user has skipped certain portions of an item of content that include coarse language. Accordingly, the presentation analysis service may recommend an adapted presentation of the item of content that does not include the coarse language (e.g., selectively muting audio content that contains coarse language or selectively replacing words of coarse language in text with punctuation characters, etc.).

An adapted presentation may also include a presentation of an item of content that is a companion to the item of content. For example, the presentation analysis service may determine a current presentation of an item of content being currently presented by a user computing device. The presentation analysis service may determine a corresponding presentation position of a companion item of content. The presentation analysis service then may cause the presentation of the companion item of content from the corresponding presentation position. The companion item of content may be in the same medium as the originally-presented item of content, or in a different medium. The companion item of content may have a different dialect, different level of coarse language, or different difficulty level from the originally-presented item of content. Still other implementations of adaptive presentation are possible.

Turning to FIG. 1, an illustrative network environment 100 is shown. The network environment 100 may include a user computing device 102, a network 106, a human interaction task system 108, a presentation analysis server 110 and an analysis data store 112. The constituents of the network environment 100 may be in communication with each other either locally or over the network 106.

The user computing device 102 may be any computing device capable of communicating over the network 106, such as a laptop or tablet computer, personal computer, personal digital assistant (PDA), hybrid PDA/mobile phone, mobile phone, global positioning system (GPS) device, electronic book reader, set-top box, camera, audiobook player, digital media player, video game console, in-store kiosk, television, one or more processors, integrated components for inclusion in computing devices, appliances, electronic devices for inclusion in vehicles or machinery, gaming devices, or the like.

The user computing device 102 may generally be capable of presenting content to a user. For example, the user computing device 102 may be capable of playing audio content by directing audible output through speakers, headphones, or the like. The user computing device 102 may also be capable of presenting images, video content, text and user interfaces on a display.

The user computing device 102 may further be capable of receiving user input (e.g., to start or stop the presentation of an item of content) through a user input device, such as a keyboard, mouse, touchpad, trackball, touchscreen display, gamepad, or other input device known in the art. The user computing device 102 may also be capable of receiving voice commands by means of a microphone, audio receiver, etc. A speech recognition engine may be provided with the user computing device 102 to process voice commands. The user computing device 102 may further include functionality that enables a user to select a presentation position in an item of content (e.g., a user interface that includes controls corresponding to portions of the item of content, presentation positions of the item of content, etc.). The user computing device 102 may also be configured to monitor the presentation position of an item of content presented by the user computing device 102, and communicate the presentation position as presentation information over the network 106 to the presentation analysis server 110. User input may also (or instead) be used to determine presentation information for one or more items of content. For example, a user may provide input to the user computing device 102 indicating which portion(s) of an item of content he or she caused to be presented (or did not cause to be presented). The user may also provide user input pertaining to how long it took him or her to complete an item of content. In some embodiments, the user computing device 102 requests permission from a user of the user computing device 102 before providing presentation information over the network 106 to the presentation analysis server 110.

The user computing device 102 may additionally be capable of accessing network resources, such as Web sites providing content pages, via the network 106. For example, the user computing device 102 may be provided with a network resource browser capable of displaying content pages provided by the presentation analysis server 110 via the network 106. Items of content may be presented through these content pages on the user computing device 102, e.g., by streaming an item of dynamic content from the presentation analysis server 110 over the network 106 to the user computing device 102.

In some embodiments, the user computing device 102 includes or is in communication with in communication with one or more hard disk drives, solid state memories and/or any other type of non-transitory computer-readable storage medium accessible to or integrated within the user computing device 102. The user computing device 102 may store one or more items of content to such a local or remote electronic data store (not shown). The user computing device 102 may also store presentation information related to an item of content presented by the user computing device 102. This presentation information may track a user's progress through an item of content. Items of content may be retrieved from storage and presented by the user computing device 102.

The network 106 may be any wired network, wireless network, or combination thereof. In addition, the network 106 may be a personal area network, local area network, wide area network, cable network, satellite network, cellular telephone network, or combination thereof. Protocols and components for communicating via the Internet or any of the other aforementioned types of communication networks are well known to those skilled in the art of computer communications and thus, need not be described in more detail herein.

The provider computing device 108 is a computing device (or group of computing devices) that are associated with a provider of one or more items of content. Examples of providers may include producers, publishers, or authors of one or more items of content. Providers may also include purveyors of items of content, such as retailers, libraries, or repositories of content. Such retailers, libraries, or repositories may be associated with a network-based service that provides items of content, e.g., by transmitting or otherwise providing digital items of content to a user computing device 102.

The provider computing device 108 may be configured to obtain presentation information obtained from user computing devices 102 and aggregated by the presentation analysis server 110. In some embodiments, the provider computing device 108 is configured to obtain presentation information directly from one or more user computing devices 102 and to aggregate the obtained presentation information on its own. The provider computing device 108 may further present the obtained presentation information and one or more recommendations pertaining thereto in a graphical format, a numerical format, a textual format, or in any other format or a combination of formats. Further, a provider computing device 108 may generally include any or all of the capabilities of a user computing device 102, and may be embodied in any of the types of computing devices in which a user computing device 102 may be embodied. However, it will be recognized that the provider computing device 108 need not be capable of presenting an item of content.

The presentation analysis server 110 may include one or more computing devices that may perform a variety of operations to implement the presentation analysis service. For example, the presentation analysis server may provide items of content to the user computing device 102 over the network 106; present an item of content via a content page hosted on the network 106; stream items of content over the network 106 to the user computing device 102 for presentation thereon; obtain presentation information from a user computing device 102; aggregate presentation information obtained from a plurality of user computing devices 102; provide recommendations to a user computing device 102 or to a provider computing device 108 based on the presentation information; provide instructions to adapt the presentation of an item of content to the user computing device 102; provide recommendations for adapted presentations of an item of content to a provider computing device 108; and perform other operations to implement the presentation analysis service. Additional operations of the presentation analysis server 110 are described below with respect to FIG. 2.

The presentation analysis server 110 may be in communication with an analysis data store 112. In some embodiments, the analysis data store 112 stores presentation information obtained by the presentation analysis server 110 from one or more user computing devices. This presentation information may be organized according to an item of content to which the presentation information pertains or according to a user computing device 102 from which the presentation position was obtained. The presentation information may also be stored in aggregate form (e.g., as an average or statistical distribution of various metrics pertaining to presentation obtained from multiple user computing devices 102).

The analysis data store 112 may additionally electronically store items of content, such as audiobooks, musical works, electronic books, television programs, video clips, movies, multimedia content, video games and other types of content. Multiple items of content pertaining to the same content title, sometimes referred to herein as "companion" items of content, may be stored in the analysis data store 112. These companion items of content may be embodied in the same medium, or in different media. Further, companion items of content may have varying levels of coarse or explicit language; varying dialects or languages; and varying difficulty levels.

In addition to storing companion items of content, the analysis data store 112 may store content synchronization information mapping a presentation position in one companion item of content to a corresponding presentation position in another companion item of content. For more information pertaining to content synchronization information, the systems and methods described herein can be used in conjunction with any of the features described in the following: U.S. patent application Ser. No. 13/604,482, entitled "IDENTIFYING CORRESPONDING REGIONS OF CONTENT" and filed on Sep. 5, 2012; U.S. patent application Ser. No. 13/604,486, entitled "SELECTING CONTENT PORTIONS FOR ALIGNMENT" and filed on Sep. 5, 2012; U.S. patent application Ser. No. 13/070,313, entitled "SYNCHRONIZING DIGITAL CONTENT," and filed on Mar. 23, 2011; and U.S. patent application Ser. No. 12/273,473, entitled "SYNCHRONIZATION OF DIGITAL CONTENT" and filed on Nov. 18, 2008, The entire disclosures of all four of these applications were previously incorporated by reference above. This content synchronization information may be used in adaptively presenting an item of content, as discussed further with respect to FIG. 5.

The analysis data store 112 may be embodied in hard disk drives, solid state memories and/or any other type of non-transitory computer-readable storage medium accessible to the presentation analysis server 110. The analysis data store 112 may also be distributed or partitioned across multiple local and/or storage devices as is known in the art without departing from the spirit and scope of the present disclosure. In yet other embodiments, the analysis data store 112 is a data storage web service.

The user computing device 102 and presentation analysis server 110 may each be embodied in a plurality of devices, each executing an instance of the respective content user computing device 102 and presentation analysis server 110. A server or other computing system implementing the user computing device 102 and presentation analysis server 110 may include a network interface, memory, processing unit and non-transitory computer-readable medium drive, all of which may communicate with each other by way of a communication bus. Moreover, a processing unit may itself be referred to as a computing device. The network interface may provide connectivity over the network 106 and/or other networks or computer systems. The processing unit may communicate to and from memory containing program instructions that the processing unit executes in order to operate the user computing device 102 and presentation analysis server 110. The memory generally includes RAM, ROM and/or other persistent and/or auxiliary non-transitory computer-readable storage media.

It will be recognized that many of the devices described above are optional and that embodiments of the environment 100 may or may not combine devices. Furthermore, devices need not be distinct or discrete. Devices may also be reorganized in the environment 100. For example, the presentation analysis server 110 may be represented in a single physical server or, alternatively, may be split into multiple physical servers. The entire presentation analysis service may be represented in a single user computing device 102 as well.

Additionally, in some embodiments, the presentation analysis service is implemented by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment.

Figure 2:
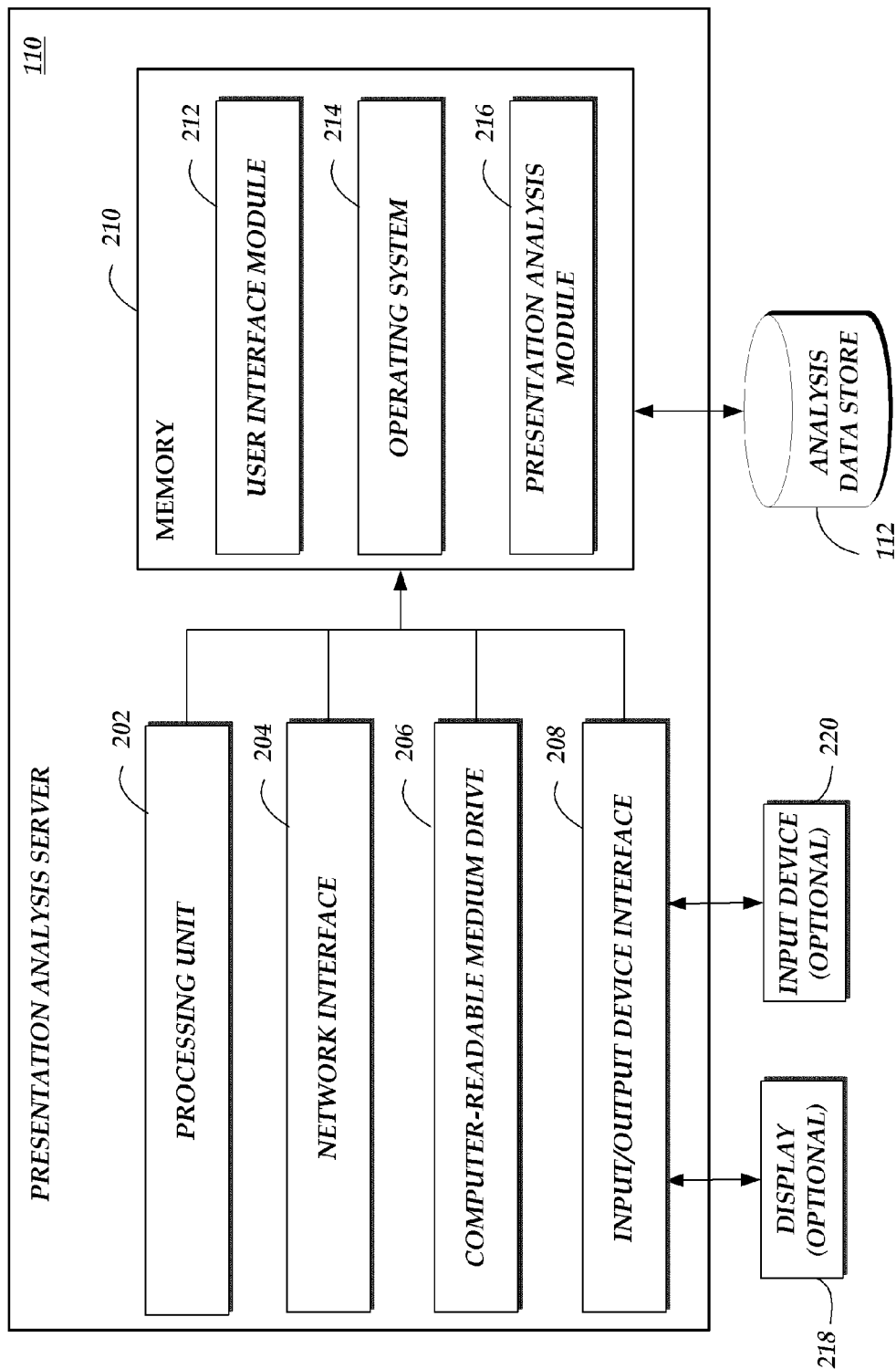
FIG. 2 is a schematic block diagram depicting an illustrative presentation analysis server of the network environment depicted in FIG. 1.

FIG. 2 is a schematic diagram of the presentation analysis server 110 shown in FIG. 1. The presentation analysis server 110 includes an arrangement of computer hardware and software components that may be used to implement the presentation analysis service. FIG. 2 depicts a general architecture of the presentation analysis server 110 illustrated in FIG. 1. The presentation analysis server 110 may include more (or fewer) components than those shown in FIG. 2.

The presentation analysis server 110 includes a processing unit 202, a network interface 204, a non-transitory computer-readable medium drive 206 and an input/output device interface 208, all of which may communicate with one another by way of a communication bus. As illustrated, the presentation analysis server 110 is optionally associated with, or in communication with, an optional display 218 and an optional input device 220. The display 218 and input device 220 may be used in embodiments in which users interact directly with the presentation analysis server 110, such as an integrated in-store kiosk or integrated component for inclusion in an automobile, boat, train, or airplane, for example. In other embodiments, the display 218 and input device 220 may be included in the user computing device 102 shown in FIG. 1. The network interface 204 may provide presentation analysis server 110 with connectivity to one or more networks or computing systems. The processing unit 202 may thus receive information and instructions from other computing systems (such as the user computing device 102) or services via a network. The processing unit 202 may also communicate to and from memory 210 and further provide output information for an optional display 218 via the input/output device interface 208. The input/output device interface 208 may accept input from the optional input device 220, such as a keyboard, mouse, digital pen, touch screen, or gestures recorded via motion capture. The input/output device interface 220 may also output audio data to speakers or headphones (not shown).

The memory 210 contains computer program instructions that the processing unit 202 executes in order to implement one or more embodiments of the presentation analysis service. The memory 210 may include RAM, ROM and/or other persistent or non-transitory computer-readable storage media. The memory 210 may store an operating system 214 that provides computer program instructions for use by the processing unit 202 in the general administration and operation of the presentation analysis server 110. The memory 210 may further include other information for implementing aspects of the presentation analysis service. For example, in one embodiment, the memory 210 includes a user interface module 212 that facilitates generation of user interfaces (such as by providing instructions therefor) for display upon a computing device such as the user computing device 102 or the provider computing device 108. For example, a user interface may be displayed via a navigation interface such as a web browser provided with the user computing device 102. The user interface may include presentation information, graphs of presentation information, recommendations for adapted presentations, recommendations to provide items of content, or other user interface elements.

In addition to the user interface module 212, the memory 210 may include a presentation analysis module 216 that may be executed by the processing unit 202. In one embodiment, the presentation analysis module 216 may be used to implement the presentation analysis service. For example, the presentation analysis module 216 may obtain presentation information from one or more user computing devices 102; aggregate the presentation information to generate aggregate presentation information; generate recommendations based on the presentation information; provide recommendations to a user computing device 102 or a provider computing device 108; generate instructions for adapting a presentation of an item of content; maintain one or more user accounts that identify items of content associated with a particular user (e.g., items of content that the user may have purchased, rented, streamed, or otherwise consumed or obtained), and perform other functions to implement the presentation analysis service.

In some embodiments, the presentation analysis service is implemented partially or entirely by a user computing device 102 or by a provider computing device 108. For example, the presentation analysis service may be provided as specialized application software and/or hardware on the user computing device 102 or the provider computing device 108. Accordingly, the user computing device 102 or the provider computing device 108 may include a presentation analysis module 216 and other components that operate similarly to the components illustrated as part of the presentation analysis server 110, including a processing unit 202, network interface 204, non-transitory computer-readable medium drive 206, input/output interface 208, memory 210, user interface module 212 and so forth.

Figure 3:
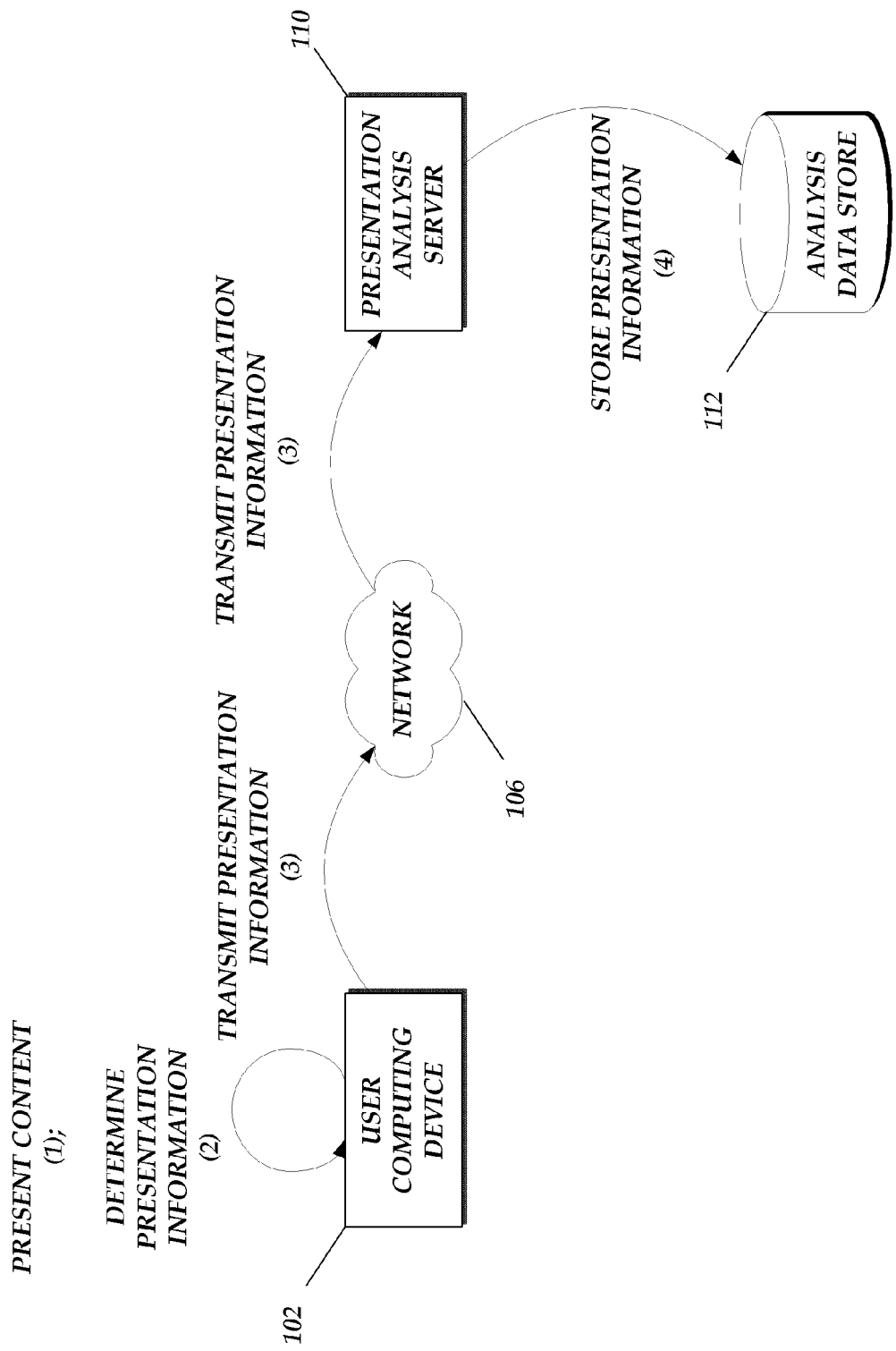
FIG. 3 is a state diagram of an illustrative operation for obtaining presentation information.
Figure 4:
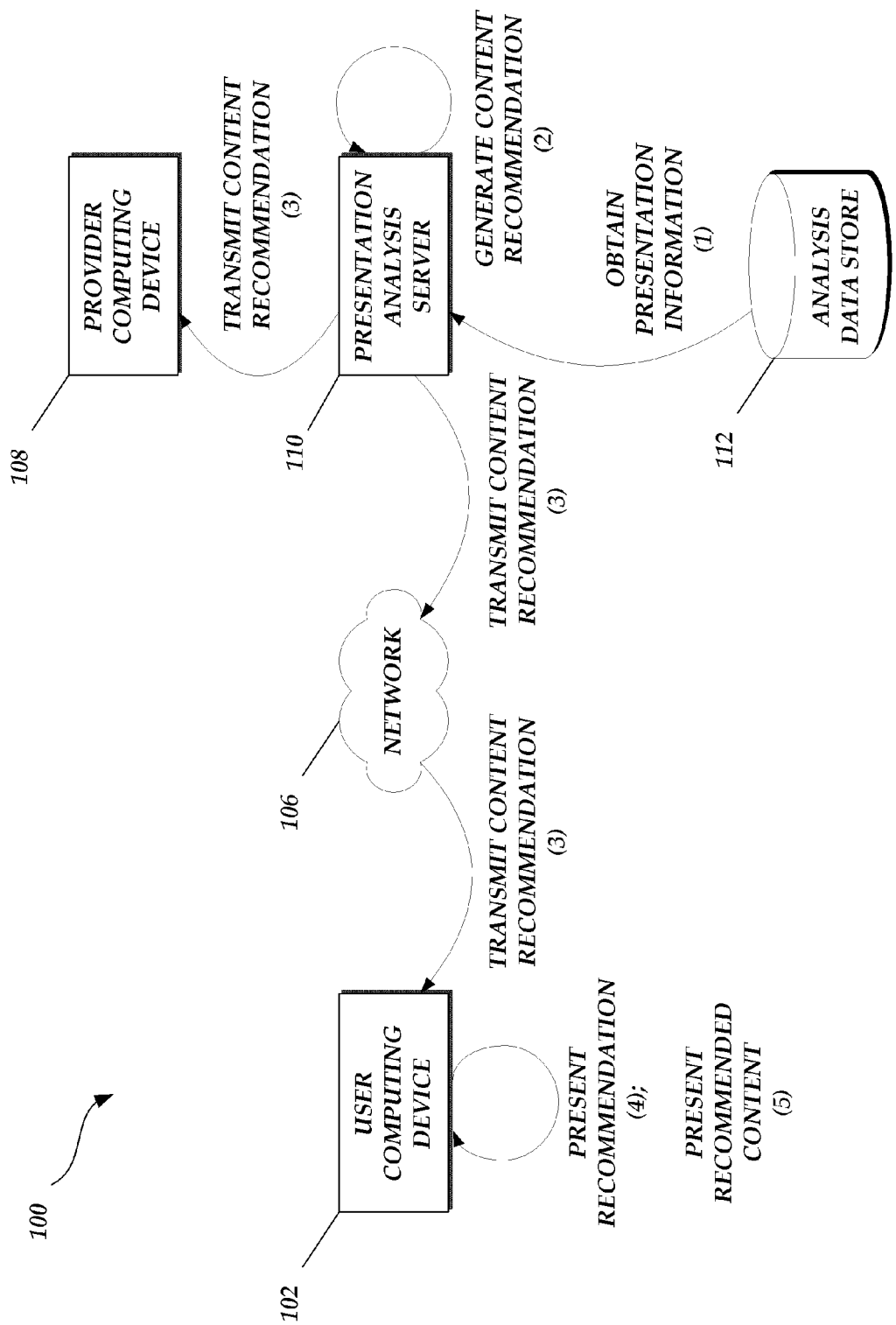
FIG. 4 is a state diagram of an illustrative operation for providing recommendations for content presentation.

As discussed above, the presentation analysis service may perform several operations within the network environment 100. Example operations are shown in FIG. 3, FIG. 4, and FIG. 5. It should be emphasized that the operations shown in FIG. 3, FIG. 4, and FIG. 5 are illustrative examples. Other implementations of the presentation analysis service are possible. More generally, the functionality of the presentation analysis service may be allocated among one or more computing devices as desired.

Turning specifically to FIG. 3, an example operation for obtaining presentation information is shown. A user computing device 102 may present an item of content (1) and determine presentation information (2) by monitoring or measuring the presentation of the item of content and/or by receiving user input indicating how the content was presented by the user computing device 102, as discussed above. Generally described, presentation information may include information regarding a state of presentation of an item of content with respect to time. For example, presentation information may include information pertaining to how much of an item of content or which portions of the item of content have been presented to a user since a time at which the user acquired the item of content. Presentation information may further include information regarding presentation session length, which may describe a duration of time over which the item of content is presented by a user computing device 102. For example, if a user starts reading an electronic book on his or her e-reader at 1:00 PM, stops reading at 3:00 PM, starts reading again at 5:30 PM, and stops reading again at 7:00 PM, the presentation information may indicate that the user consumed the item of content in two presentation sessions: one lasting two hours, and another lasting an hour and a half. Further information pertaining to presentation information is discussed below with respect to FIG. 7.

The user computing device 102 may present the item of content continuously or dynamically. For example, the item of content may include audio and/or video content that is presented dynamically. Such an item of content is sometimes referred to herein as an "item of dynamic content." For an item of dynamic content, the presentation position may be measured with respect to the overall running time of the item of dynamic content (e.g., a timestamp corresponding to the user's presentation position).

The user computing device 102 may also present an item of content in discrete portions. For example, the item of content may include textual and/or graphical content that is organized into pages, slides, cards, levels, etc. Examples of items of content presented in discrete portions may include items of textual content (e.g., electronic books, periodicals, and the like) slide presentations, video games, etc. Such items of content, in addition to having their ordinary meaning, are sometimes referred to herein as "items of interactive content." The presentation position of an item of interactive content may not change except in response to user input (e.g., a user turning a page of an electronic book, clicking a slide to go to the next slide, scrolling down an article included in an electronic periodical, completing a level of a video game, etc.). Accordingly, the presentation position may be measured with respect to which discrete portions have been presented by the user computing device 102 (e.g., which pages or slides were displayed, how far a user scrolled down, how many levels a user completed, etc.).

Presentation information pertaining to an item of content presented in discrete portions may include information regarding the speed at which the user advanced the presentation position. For example, the presentation position of an electronic book may be advanced by a user turning pages as the electronic book is presented. Based on the user's page turns, the user's average reading speed may be determined, as may be measured in pages per unit time, words per unit time, or some other metric. Information regarding the speed at which the presentation position is advanced as an item of dynamic content is presented may also be included. For more information pertaining to the rate at which a presentation position may be advanced in an item of content being presented, see U.S. patent application Ser. No. 13/536,711, entitled "PACING CONTENT" and filed on Jun. 28, 2012. The disclosure of this application is hereby incorporated by reference in its entirety.

Other ways by which presentation position may be measured and monitored are possible. In one embodiment, presentation position may be measured by structural subdivisions in an item of content. For example, structural subdivisions in an item of dynamic content may be identified with reference to one or more reference points in the item of dynamic content (e.g., the subdivision may be bounded by a reference point on either chronological "side"). Structural subdivisions in an item of dynamic content may similarly be identified with reference to one or more reference points in the item of interactive content (e.g., the subdivision may include a set of one or more discrete portions, such as a chapter of an electronic book including one or more pages of the electronic book). Reference points using may be identified automated techniques, manual techniques, or a combination of the two. In one embodiment, the presentation analysis service identifies reference points by using labels or other markup that may be embedded in or included with the item of content. For example, the beginnings or ends of chapters may be labeled as reference points in an audiobook or electronic book. Direct analysis of an item of content (e.g., performing audio analysis and/or image processing on an item of dynamic content, or performing optical character recognition on an item of interactive content that includes text) may also be used to identify structural subdivisions in the item of dynamic content. More information on identifying structural subdivisions in an item of content can be found in U.S. patent application Ser. No. 13/536,711, entitled "PACING CONTENT" and filed on Jun. 28, 2012. The disclosure of this application was previously incorporated by reference in its entirety above.

It should be noted that the user computing device 102 need not present the item of content in a straightforward, start-to-finish fashion. Rather, the user computing device 102 may present one or more portions of the item of content out of order, or may present one or more portions of the item of content more than once. Further, some portions of the item of content may not be presented at all by the user computing device 102 (e.g., if a user of the user computing device 102 chooses to "skip" the portion). Accordingly, the user computing device 102 (or other computing device presenting an item of content) may generally include functionality that enables a user to select a presentation position in the item of content, whether before or after the current presentation position.

The user computing device 102 may transmit the presentation information (3) to the presentation analysis server 110 over the network 106. In some embodiments, the user computing device 102 periodically transmits presentation information to the presentation analysis server 110. For example, presentation information may be transmitted once a minute; once an hour; once a day; or once per any other time period. In other embodiments, the user computing device 102 transmits presentation information every time the user computing device 102 stops presenting the item of content (e.g., when a user pauses or stops the presentation of the content but leaves the user computing device 102 on; when a user turns off or disables his or her user computing device 102; or when the user puts his or her user computing device 102 to sleep). In still other embodiments, the presentation analysis server 110 may poll a user computing device 102 to obtain presentation information from time to time. In yet further embodiments, the presentation information is only transmitted to the presentation analysis server 110 if the user grants permission to the presentation analysis server to obtain presentation information from his or her user computing device 102. For example, the user may "opt-in" to his or her presentation information being gathered. Personally identifiable information of the user may also be removed from the presentation information transmitted to the presentation analysis server 110.

Once the presentation information has been transmitted to the presentation analysis server 110, the presentation analysis server 110 may store the presentation information (4) to the analysis data store 112. The presentation analysis server 110 may store the presentation information to the analysis data store 112 in several ways. In some embodiments, the presentation analysis server 110 associates the presentation information that it obtains with a particular user of the user computing device 102. In this regard, presentation position may be aggregated for a particular user of the user computing device 102 and stored in the analysis data store 112 for use in generating personalized recommendations for the user, or for selecting an adapted presentation that the user might prefer based on the stored presentation information.

In other embodiments, the presentation analysis server 110 stores presentation information for an item of content in aggregate form. For example, presentation information from multiple user computing devices 102 that are presenting or have presented the same item of content may be collected. From this collected presentation information, the presentation analysis server 110 may determine, for instance, an average or statistical distribution of various metrics pertaining to presentation of the item of content. For example, the presentation analysis service may determine an average completion percentage of an item of content (e.g., how much of the item of content was presented to by a user computing device within a certain time period after the item of content was acquired); a percentage of user computing devices 102 that presented (or skipped, or re-presented) a portion of the item of content; an average speed at which the presentation position of the item of content was advanced (e.g., an average reading speed for an electronic book); an average presentation session length; and other aggregate information. Further statistical information pertaining to these metrics, such as standard deviations, histograms, percentages, percentiles, medians, and the like may also be included in aggregate presentation information.

Having obtained the presentation information, the presentation analysis service may provide recommendations based on the presentation information maintained in the analysis data store 112. FIG. 4 displays an illustrative operation of the presentation analysis service by which recommendations based on the presentation information may be provided.

In some embodiments, content recommendations are provided to a provider of items of content. The presentation analysis server 110 may obtain presentation information (1) pertaining to an item of content from the analysis data store 112. In some embodiments, the presentation information used to generate recommendations to be provided to a provider of items of content is in aggregate form. The aggregate presentation information may include, for example, average completion percentage of an item of content (e.g., how much of the item of content was presented to by a user computing device within a certain time period after the item of content was acquired); a percentage of user computing devices 102 that presented (or skipped, or re-presented) a portion of the item of content; an average speed at which the presentation position of the item of content was advanced (e.g., an average reading speed for an electronic book); an average presentation session length, and so forth.

Based on the aggregate presentation information, the presentation analysis server may generate a recommendation (2) to be provided to a provider computing device 108 associated with a provider of items of content. This recommendation may advantageously help the provider of items of content to tailor its offerings to the interest of many users of items of content. Once the recommendation has been generated, it may be provided (3) to the provider computing device 108.

Several types of recommendations are possible. In one example, the provider of an electronic book may be interested in offering an abridged version of the electronic book. Accordingly, the recommendation may identify portions of the electronic book that at least a threshold percentage of users skipped, and may recommend that the skipped portions be removed in the abridged version. The provider of the electronic book may also be interested in offering an audiobook that is a companion to the electronic book. As audiobooks are often abridged relative to their companion electronic book, the recommendation may identify portions of the electronic book that at least a threshold percentage or number of users skipped, and may recommend that the skipped portions not be narrated in an audiobook version to be generated by the provider.

In another example, the provider of an item of content may wish to know which characters (or other referents) in the item of content are popular. Accordingly, the presentation analysis service may determine which characters are present in portions of the item of content that may have been presented multiple times, or that may have been skipped to by users of the item of content. These characters may be deemed popular characters, and thus the recommendation may include a recommendation to provide more items of content pertaining to the popular characters.

In yet another example, the provider of items of content may wish to know how long users are spending on an item of interactive content, such as an electronic book or a video game. For example, the provider of the item of content may be interested in providing electronic books that are "quick reads" or "page-turners," and thus may prefer to offer electronic books that have relatively low completion times per unit book length (as may be measured in pages, words, etc.). Accordingly, the presentation analysis service may determine the average time it takes for a user to complete one or more electronic books based on the aggregate presentation information associated with each of the items of content. The recommendation may thus include a list of one or more electronic books that have an average reading time that satisfies a threshold reading time, along with an indication that the provider should provide the one or more electronic books.

In still a further example, the provider of items of content may wish to identify items of content that users may be starting, but abandoning midway through. For example, users of an item of content may consume part of the item of content, but fail to finish the item of content within a certain time period. Accordingly, the presentation analysis service may identify one or more items of content that at least a threshold percentage of users failed to complete within a certain time interval after acquiring the item of content. The recommendation may thus include a list of one or more items of content that the provider should not offer or should stop offering, given that users are failing to finish the items of content. Still other types of recommendations are possible.

In other embodiments, recommendations are provided to a user of an item of content. Accordingly, the presentation analysis server 110 may obtain presentation information (1) from the analysis data store 112 that pertains to the item of content presented by a user computing device 102. This presentation information may be associated with the user, or may be an aggregate of presentation information obtained from many user computing devices 102. Based on the presentation information, the presentation analysis server may generate a recommendation (2) to be provided to the user computing device. This recommendation may advantageously help the user to learn about items of content that may be compatible with how the user consumes the item of content. This recommendation (3) may be transmitted over the network to the user computing device 102. Optionally, a recommended item of content may retrieved from the analysis data store 112 and transmitted by the presentation analysis server 110 over the network 106 to the user computing device 102. The user computing device 102 may then present the recommendation via a user interface (4), and may further optionally present the item of content (5) if it was provided over the network 106.

Again, several types of recommendations are possible. In one example, the presentation analysis server 110 may determine that certain portions of an item of content have been presented multiple times by the user computing device 102, or that the user may have skipped to certain portions of the item of content. A referent may be identified in such portions of the item of content, and the presentation analysis service may identify another item of content that relates to the referent. A recommendation to obtain the identified item of content may be generated accordingly. The recommendation may further be presented by the user computing device 102 in conjunction with a selectable user interface element that enables the user to obtain the recommended item of content (e.g., to download the recommended item of content) if it was not previously provided over the network 106. On the other hand, if the presentation information indicates that a user presented a portion of the item of content multiple times, it may indicate that the user had difficulty understanding that portion of the item of content. A difficulty level of the item of content or the portion of the item of content may be determined by the presentation analysis server, and the presentation analysis server 110 may provide a recommendation that the user acquire a companion item of content at a lower difficulty level.

In another example, the presentation analysis service may determine that the user computing device 102 has provided a presentation of less than a threshold percentage of an item of content within a predetermined time period after the item of content was acquired. For example, the user computing device 102 may have presented only about 10% (or less) of the item of content since the item of content was downloaded to the user computing device 102 as part of a digital download purchase, rental, or loan. Presentation information reflecting this limited completion percentage may have been previously provided by the user computing device 102 to the presentation analysis server 110 and stored in the analysis data store 112. Accordingly, the presentation analysis server 110 may provide a recommendation to the user computing device 102 suggesting that the user obtain a refund or other allocation of credit (e.g., store credit from a provider of items of content such as a retailer affiliated with a network-based service). The recommendation may further be presented by the user computing device 102 in conjunction with a selectable user interface element that enables the user to obtain the allocation of credit. In some embodiments, the user's access to the item of content is disabled before the allocation of credit is provided to the user. For example, the item of content may be deleted from the user computing device 102. In this regard, an implementation of the presentation analysis service in which items of content may be "returned" may be achieved.

In a further example, the presentation analysis service may analyze presentation information for multiple items of content associated with a user of a user computing device 102. These items of content may be items of content that the user owns and has stored on his or her user computing device 102 (e.g., a "digital library" associated with the user), or may include items of content that are associated with a user's account maintained by the presentation analysis server 110 and provided to the user's device on a streaming basis, without necessarily storing the item of content with the user computing device 102.

In a particular, non-limiting application of this concept, the presentation analysis service may analyze presentation information for one or more items of content which have been partially or totally consumed by the user in light of the difficulty level of each item of content. For example, the presentation information may indicate that a user of the user computing device 102 has a relatively easy time reading short chapter electronic books (e.g., as may be indicated by the user steadily progressing through the electronic book), but has a relatively difficult time reading longer chapter electronic books (e.g., as may be indicated by the user repeating sections of the electronic book, reading more slowly, getting "stuck" on certain parts, etc.). This information can be used to gauge a difficulty level at which the user reads (or otherwise consumes content). Accordingly, the presentation analysis service may identify other items of content having an appropriate difficulty level for the user, and recommend those items of content to the user. More information on measuring the difficulty level of an item of content can be found in U.S. patent application Ser. No. 13/535,260, entitled "CONVEYING QUESTIONS WITH CONTENT" and filed on Jul. 18, 2012. The disclosure of this application is hereby incorporated by reference in its entirety. Further information pertaining to identifying the difficulty of an item of content is discussed below with respect to FIG. 6B.

In another, non-limiting application of this concept, the presentation analysis service may generate recommendations based on items of content that the user has completed in part or in whole. For example, the presentation analysis service may determine that the user has completed at least a threshold percentage of an item of content, such as reading at least a certain percentage of pages of an electronic book or listening to an audiobook for at least a certain percentage of the overall running time of the audiobook. Based on the items of content that the user has partially or wholly completed, one or more other items of content may be identified and recommended to the user. For example, if the user has sufficiently completed one or more items of content that relate to particular subject matter or that belong to a particular series, the presentation analysis service might recommend that the user obtain other items of content that relate to that subject matter or that belong to that series. Alternately, the presentation analysis service might determine that users that complete one item of content also often complete another item of content. Thus, if a particular user has completed at least a threshold percentage of the first item of content, a recommendation to obtain the other item of content may be provided to the user.

Again, still other types of recommendations to be provided to a user computing device 102 for presentation are possible. For example, presentation information associated with a user may indicate that the user prefers "quick reads," e.g., electronic books that can be completed in less than a certain amount of time. Accordingly, the presentation analysis service may, based on aggregate presentation information associated with a plurality of electronic books, identify one or more electronic books with an average reading time that satisfies a threshold. A recommendation identifying these electronic books may be provided to the user computing device 102 for presentation thereon. Further, a user may choose to limit the scope of aggregate presentation information from which recommendations are generated for him or her. For example, the user may select one or more other users (such as friends, family members, book club members, classmates, social network connections or groups, etc.) whose presentation information may be aggregated and used to generate recommendations for the user, without necessarily basing recommendations on presentation information aggregated from all users whose user computing devices 102 have presented an item of content.

In addition to providing recommendations, the presentation analysis service may further provide functionality for adaptively presenting an item of content. FIG. 5 displays an illustrative operation of the presentation analysis service by which the adaptive presentation of content may be achieved.

The presentation analysis server 110 may obtain presentation information (1) from the analysis data store 112. As discussed above, the presentation information stored in the analysis data store 112 may include information pertaining to which portions of an item of content have been presented by a user computing device 102 with respect to time. The presentation information may include information regarding a current presentation position of the item of content. The presentation information may further include information pertaining to a user's selection of presentation positions in the item of content such as information pertaining to which portions of the item of content were "skipped" or otherwise not presented by the user computing device 102.

Based on the presentation information, the presentation analysis server 110 may determine a presentation adaptation (2) to provide to the user computing device 102, as discussed further below. Instructions for the adaptation may be transmitted (3) to the user computing device 102 over the network 106. In some embodiments, a companion item of content is also transmitted with the adaptation instructions to the user computing device 102. The user computing device 102 may then adaptively present the same item of content or may present a companion item of content according to the adaptation instructions (4).

The presentation of an item of content may be adapted in several ways. In some embodiments, adaptively presenting an item of content includes removing certain portions of the item of content. For example, if the presentation information indicates that a user has skipped portions of an item of content that include coarse language (e.g., "four-letter words"), the item of content may be adaptively presented by causing the user computing device 102 to subsequently skip portions of the item of content that include coarse language that occur later in the item of content than the current presentation position of the item of content. Alternately, the user computing device 102 may be configured to prevent coarse language from being presented, based on the presentation adaptation instructions. For example, in an item of textual content, the user computing device 102 may be operative to blur coarse language or to replace coarse language with punctuation characters. In an item of content that includes audio, the user computing device 102 may be capable of selectively muting the audio content when coarse language occurs.

In other embodiments, adapting the presentation of an item of content includes causing the presentation of another item of content that is a companion to the item of content originally presented by the user computing device 102. As discussed above, the analysis data store 112 may store one or more companion items of content. These companion items of content may be embodied in the same medium, or in different media. Further, the companion items of content may have varying levels of coarse or explicit language; varying dialects or languages; and varying difficulty levels. Additionally, the analysis data store 112 may include content synchronization information that maps a presentation position in a first companion item of content to a corresponding presentation position in a second companion item of content. More information pertaining to content synchronization information may be found in U.S. patent application Ser. No. 13/604,482, entitled "IDENTIFYING CORRESPONDING REGIONS OF CONTENT" and filed on Sep. 5, 2012; U.S. patent application Ser. No. 13/604,486, entitled "SELECTING CONTENT PORTIONS FOR ALIGNMENT" and filed on Sep. 5, 2012; U.S. patent application Ser. No. 13/070,313, entitled "SYNCHRONIZING DIGITAL CONTENT," and filed on Mar. 23, 2011; and U.S. patent application Ser. No. 12/273,473, entitled "SYNCHRONIZATION OF DIGITAL CONTENT" and filed on Nov. 18, 2008, The entire disclosures of all four of these applications were previously incorporated by reference above.

In one example, the presentation analysis service may determine that a user is "stuck" on a portion of the electronic book (e.g., has not advanced the presentation position over the electronic book), or is proceeding through the electronic book at a relatively slow reading speed. Accordingly, the presentation analysis server 110 may provide an audiobook that is a companion to the electronic book to the user computing device 102, along with instructions to present the audiobook starting from a presentation position in the audiobook that corresponds to the current presentation position of the electronic book (e.g., the presentation position at which the user became "stuck"). Content synchronization information may be used to determine a correspondence between the current presentation position in the originally-presented electronic book and a corresponding presentation position in the audiobook to be presented. Advantageously, a seamless user experience may be provided despite the change in presentation medium.

In another example, the presentation analysis service may determine that a user has skipped over portions of an electronic book that include coarse language. Accordingly, the presentation analysis server 110 may provide a companion electronic book that does not include coarse language to the user computing device 102, along with instructions to present the companion electronic book starting from a presentation position in the companion electronic book that corresponds to the current presentation position of the originally presented electronic book. Again, content synchronization information may be used to determine a correspondence between the current presentation position in the originally-presented electronic book and a corresponding presentation position in the electronic book to be adaptively presented. Advantageously, a seamless user experience may be provided.

As discussed above, presentation information may include information pertaining to how one or more user computing devices 102 present one or more portions of an item of content. This information may be used to determine recommendations and/or adaptive presentations of an item of content. In some embodiments, these recommendations and/or adaptive presentations may be determined based at least in part on presentation information pertaining to a portion of an item of content at which a referent is present, or a portion of the item of content that has a particular characteristic. For example, if a user rereads or skips to a portion of an electronic book featuring a particular character, it may indicate that the user has an interest in that character.

With reference to FIG. 6A, example referents and their associated presentation positions in an example item of content are illustrated. Generally described, referents may include characters, settings, places, things, attributes, relationships, events and the like. Presentation positions of these referents may be identified in an item of textual content, such as an electronic book, periodical, script, screenplay, libretto, transcription in a number of ways. For example, the presentation analysis service may identify a presentation position 610A of referents corresponding to one or more characters 610B. The names of the characters (or nicknames, epithets, or alternate spellings for the characters) may be located in an item of textual content using techniques such as content scraping, natural language processing, or named entity extraction, among other techniques. In a similar manner, the presentation analysis service may also identify a presentation position 620A of an event 620B in the item of textual content or a presentation position 630A of a setting 630B in the item of textual content.

The presentation analysis service may also identify a presentation position 640A of a mood referent 640B. Content elements corresponding to moods in an item of dynamic content may be identified via contextual analysis of an item of textual content that is a companion to the item of dynamic content. As discussed above, an item of dynamic content and a companion item of textual content may be synchronized. Words such as "dark," "spooky" or "terrifying" in the item of textual content might prompt the presentation analysis service to assign a "scary" mood content element to a presentation position in the item of textual content. A presentation position 640A in the item of dynamic content that corresponds to the presentation position in the item of textual content to which the scary mood was assigned may be identified based on the synchronization. Accordingly, the scary mood content element 640B may be assigned to the presentation position 640A in the item of dynamic content. Mood content elements may also be located in items of dynamic content that include music. For example, harmonic analysis on the music may reveal that music at a particular presentation position is in a minor key. Accordingly, a "sad" mood content element may be identified at the presentation position at which the music in a minor key is presented. Still other methods for identifying moods in an item of dynamic content are possible.

Several ways to locate the presentation position of referents in an item of dynamic content are possible as well. In some embodiments, the presentation position of a referent in an item of dynamic content is determined based on a synchronization of the item of dynamic content with a companion item of textual content. The presentation position of a referent in the item of companion textual content may be mapped to a presentation position in the item of dynamic content based on the synchronization described above. Accordingly, the presentation position of a referent in the item of dynamic content may be determined based on the corresponding referent in the companion item of textual content, which may be an electronic book, periodical, script, screenplay, libretto, transcription, etc.

Other ways to locate referents in an item of content are possible. For example, metadata may be provided with or incorporated into an item of content, which metadata may include information mapping referents to presentation positions of the item of content, whether the item of content is an item of textual content or an item of dynamic content. Additional methods for identifying referents and their locations in an item of textual content or an item of dynamic content may be found in U.S. patent application Ser. No. 12/972,058, entitled "GRAPHICALLY REPRESENTING ASSOCIATIONS BETWEEN REFERENTS AND STORIES," filed on Dec. 17, 2010; and in U.S. patent application Ser. No. 12/881,021, entitled "SYSTEMS AND METHODS FOR ASSOCIATING STORIES WITH RELATED REFERENTS," filed on Sep. 13, 2010. The disclosures of both of these applications were previously incorporated by reference above in their entireties.

Figure 6B:
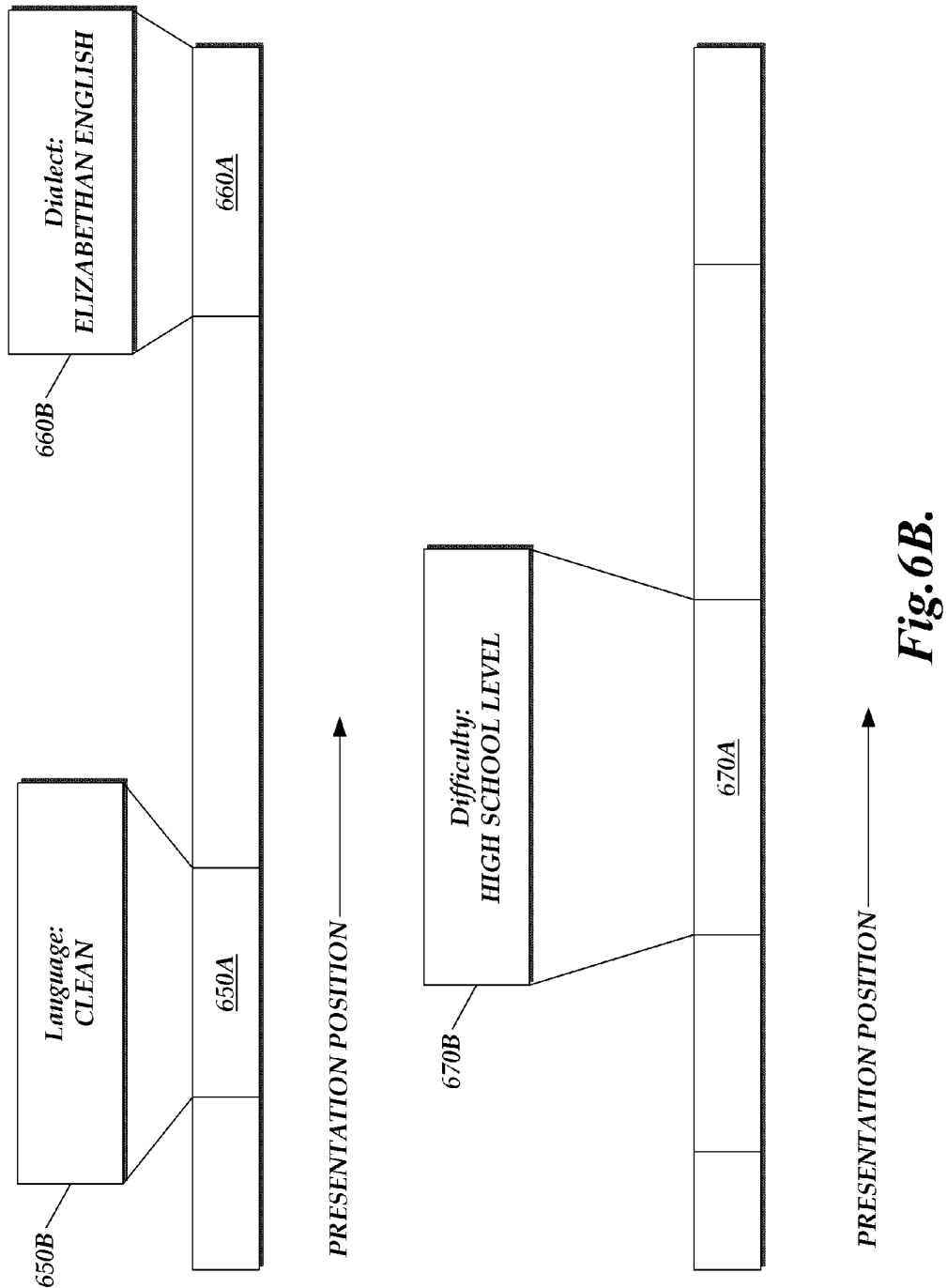

Turning to FIG. 6B, presentation information may be analyzed in light of other features of the item of content. For example, at presentation position 650A, the item of content may include "clean" language 650B, e.g., language that does not include coarse language such as profanity. Other types of information reflecting the presence or absence of explicit content may be associated with a particular presentation position of an item of content, such as a rating provided by the Motion Pictures Association of America (MPAA); a rating provided by the Entertainment Software Review Board (ESRB); or a rating provided by another ratings organization. In some embodiments, the item of content may be analyzed to determine whether explicit content is present (e.g., by analyzing textual content to identify the presence of coarse language or by performing speech-to-text on an item of audio content to identify the presence of coarse language). In other embodiments, the presentation position of explicit (or clean) content is indicated by metadata provided with or incorporated in the item of content.

With continued reference to FIG. 6B, at presentation position 660A, the item of content may include content in a particular dialect 660B. This dialect may be a regional dialect, a historical dialect, a cultural dialect, or any other form of dialect. In some embodiments, the item of content may be analyzed to determine whether content in a dialect is present at a particular presentation position. For example, textual content may be analyzed to identify words associated with a particular dialect. For example, an item of content in the historical dialect Elizabethan English may include words such as "thee," "thou," "anon," and the like. Likewise, speech-to-text on an item of audio content may be used to identify the presence of historical dialect, based on words present in the speech-to-text results. In other embodiments, the presentation position of a portion of content in a particular dialect is indicated by metadata provided with or incorporated in the item of content.

With further reference to FIG. 6B, at presentation position 670A, the item of content may include content that has a particular difficulty level 670B. This difficulty level may be measured in a number of ways. In some embodiments, the difficulty level 670B of the portion of the item of content at presentation position 670A may be determined by quantitative metrics of the difficulty of the content, such as a Gunning fog index or a Flesch-Kincaid reading score of any textual content present at the presentation position 670A. In other embodiments, the difficult level 670B of the portion of the item of content at presentation position 670A may be determined by an educational standard for which the item content (or portion thereof) is recommended (e.g., a 1st-grade reading level, a college reading level, etc.) In other embodiments, the presentation position of a portion of content with a particular difficulty level is indicated by metadata provided with or incorporated in the item of content. More information pertaining to determining a difficulty level of an item of content or portion thereof may be found in U.S. patent application Ser. No. 13/535,260, entitled "CONVEYING QUESTIONS WITH CONTENT" and filed on Jul. 18, 2012. The disclosure of this application was previously incorporated by reference in its entirety above.

So as not to obscure the principles of the present disclosure, overlapping referents or characteristics have not been depicted in FIG. 6A or FIG. 6B. However, in various embodiments, multiple referents and/or characteristics may be associated with substantially the same or overlapping presentation positions in an item of content.

Figure 7:
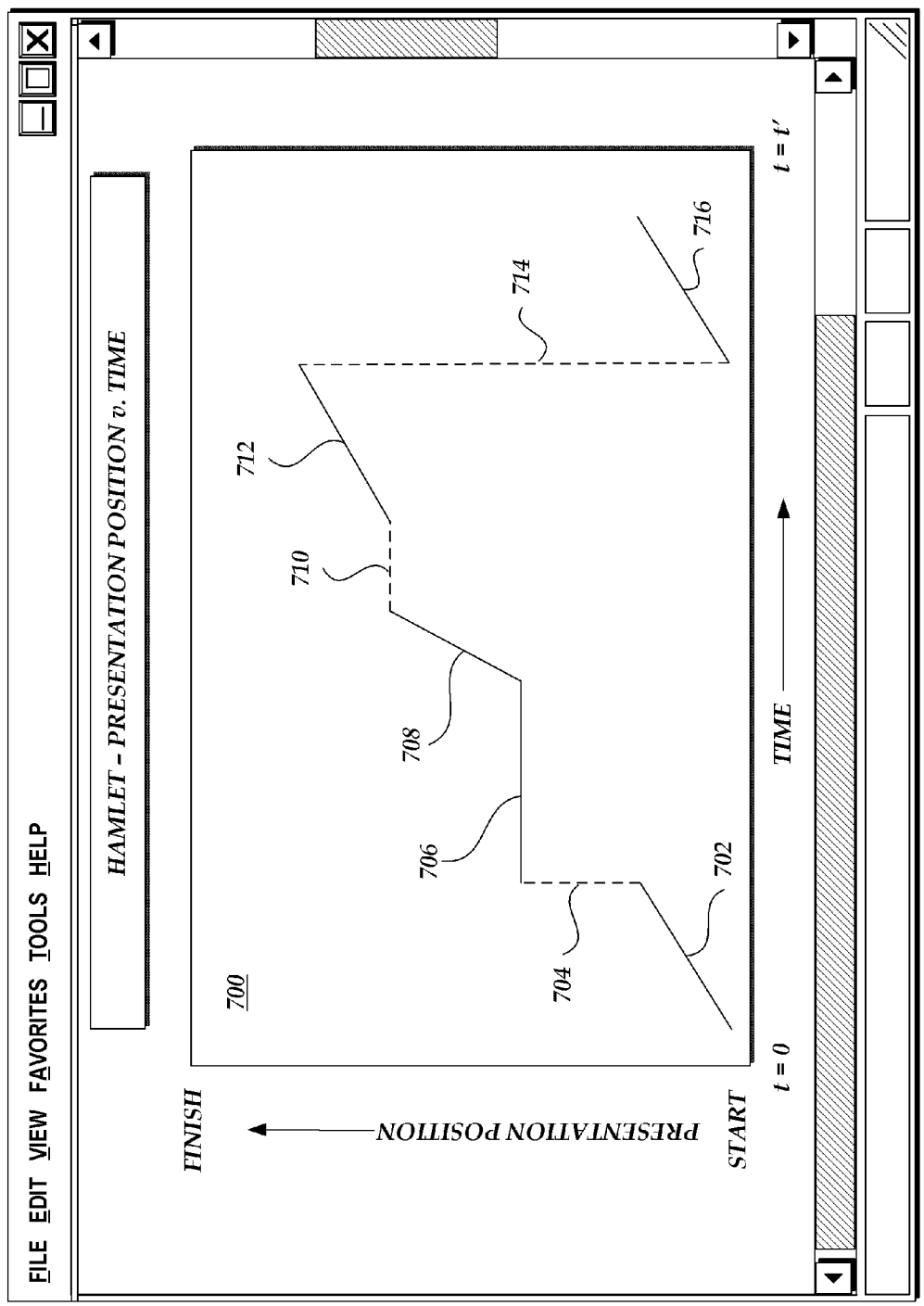
FIG. 7 is a pictorial diagram depicting an illustrative user interface that includes a display of a presentation position of an item of content with respect to time.

Turning to FIG. 7, an illustrative graph 700 of a presentation of an item of content over time is shown. This graph may be generated by presentation information obtained from one or more user computing devices 102. In this illustrative graph, solid lines represent when an item of content was presented, while dashed lines indicate non-presentation of the item of content. The horizontal axis may represent time, with t=0 indicating a time at which the item of content was first acquired by the user of a user computing device 102 and with t=t' indicating a current time. The vertical axis may represent a presentation position, which, as discussed above, may indicate how far a user of an item of content has progressed through that item of content. Accordingly, it will be recognized that the slope of a line segment on the graph 700 may represent how quickly the item of content is being consumed by a user (e.g., how quickly the presentation position has been advanced over time). The graph 700 may be provided to a user of an item of content to track his or her progress through the content, or may be provided to a provider of the item of content.

The illustrative graph 700 pertains to the presentation of an electronic book of the play Hamlet by a user computing device 102. Segments 702, 712, and 716 indicate portions of the electronic book that the user read steadily over time at a certain average reading speed. Segment 704 indicates that the user skipped from the presentation position at the end of segment 702 to the presentation position at the beginning of segment 706—in other words, a portion of Hamlet was not presented. Segment 706 indicates that the user was presenting a portion of Hamlet with his or her user computing device 102, but did not make any progress, as the presentation position did not change over time. Segment 708 indicates a portion of the electronic book that the user may have "breezed through," or read at an average reading speed significantly higher than his or her average reading speed, as may be indicated the slope of segments 702, 712, and 716. Segment 710 indicates a time interval over which the user did not consume the item of content, and thus did not advance the presentation position of the item of content. Such an interval may correspond to the user shutting down his or her user computing device 102 or disabling its content presentation capabilities (e.g., by quitting a software application on the user computing device 102 that is configured to present the item of content). Segment 714 indicates that the user skipped from the presentation position at the end of segment 712 back to a previous presentation position at the beginning of segment 716. Thus, segment 716 may correspond to a portion of Hamlet that was presented multiple times to the user by the user computing device 102.

Based on presentation information, presentation sessions that correspond to contiguous periods of time over which the user consumes the item of content (e.g., by having the item of content presented by a user computing device 102) may be identified. These presentation sessions may be bounded by periods over which the item of content was not presented (e.g., when the user computing device 102 is off or otherwise not presenting the item of content). In this particular example graph 700, two presentation sessions are shown. The first presentation session includes segments 702, 704, 706, and 708. After segment 708, a time interval over which the item of content was not presented occurred, as represented by segment 710. The next presentation session includes the segments 712, 714, and 716.

While the example graph 700 shown in FIG. 7 is based on presentation information obtained from a single user computing device 102, it will be recognized that graphs may be generated from aggregate presentation information as well. For example, presentation information may be obtained from many user computing devices 102 and used to identify an average presentation position with respect to time, an average presentation session length for an item of content, and the like. Further statistical information, such as standard deviations, histograms, percentages, percentiles, medians, and the like may also be provided with the graph 700.

Figure 8A:
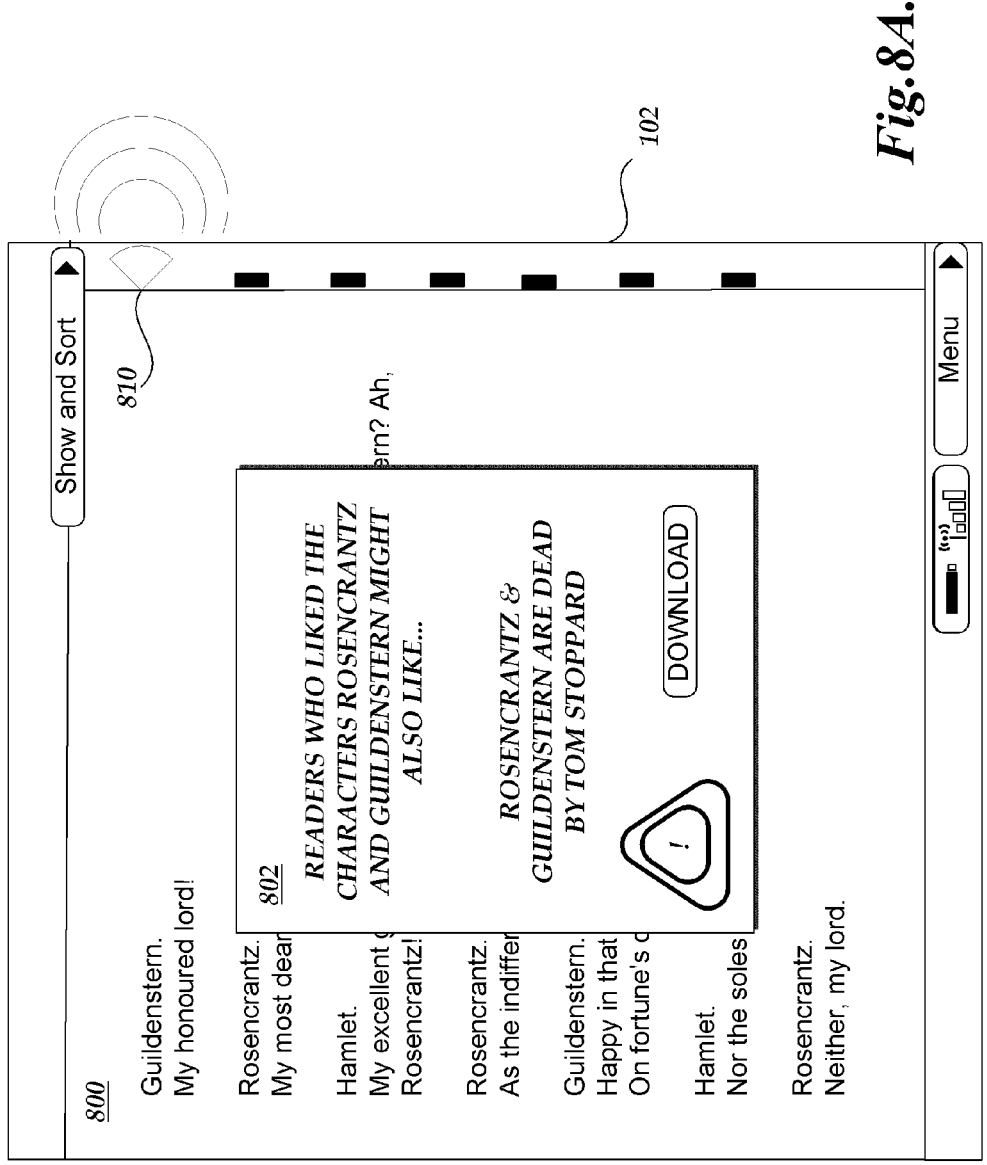
FIG. 8A and FIG. 8B are pictorial diagrams depicting illustrative user interfaces that may be provided by the presentation analysis service.
Figure 8B:
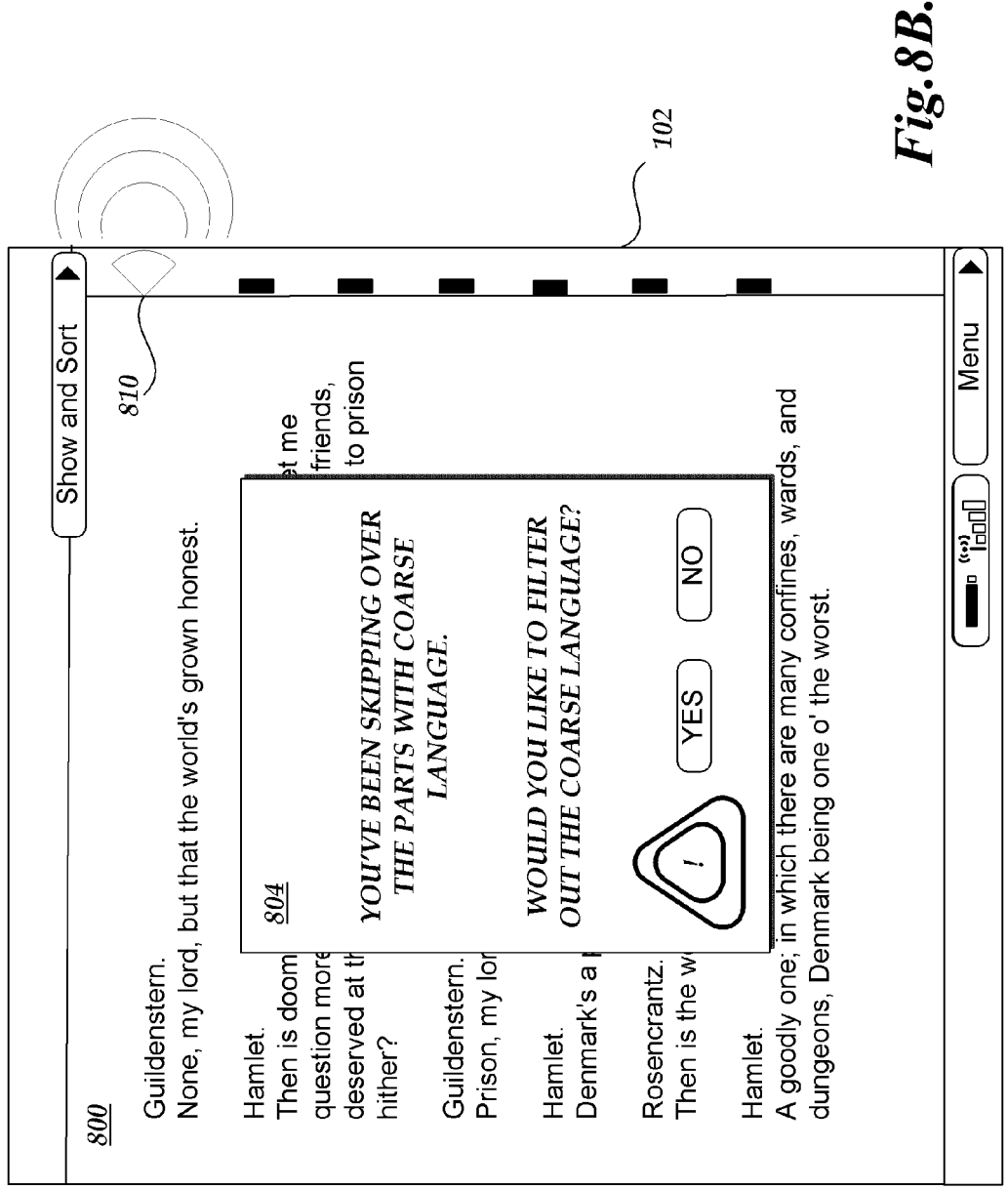

Turning to FIG. 8A and FIG. 8B, in which like reference numerals indicate like elements, a user computing device 102 presenting an item of content is displayed. The item of content may be presented visually on a display screen 800, and may also be presented audibly via speakers 810. The display screen 800 may also be configured to present user interfaces, user interface elements, and instructions therefor.

With specific reference to FIG. 8A, presentation information, whether associated with a user of the user computing device 102 whether aggregated from multiple user computing devices 102, may be used to generate a recommendation 802 to obtain another item of content, substantially as discussed above with respect to FIG. 4. This recommendation 802 may be displayed as a user interface element via the display 800, and may include basic information pertaining to the recommended item or items of content, such as a title of an item of content, author of the item of content, medium of the item of content, etc. The user interface element may further include a selectable control (such as a "download" control) with which the user may interact to cause the user computing device 102 to obtain the item of content recommended as part of recommendation 802. Further selectable controls may also be provided; for example, a "more information" selectable control may be provided with the recommendation 802. If the user interacts with the "more information" selectable control, a user interface element that includes further information about the recommended item of content may be displayed. This further information may include, for example, a genre of the recommended item of content; a running time or page length of the recommended item of content; and other information. Further, a sample of the item of content may also be provided (e.g., one or more pages of a recommended electronic book, or a few seconds or minutes of an audiobook, video, etc.).

Turning to FIG. 8B, presentation information, whether associated with a user of the user computing device 102 whether aggregated from multiple user computing devices 102, may also be used to provide a recommendation 804 for an adaptive presentation of an item of content. As discussed above, the adapted presentation of the item of content may include selectively abridging an item of content and/or presenting a companion item of content concurrently or instead of the item of content originally presented by the user computing device 802. Additionally, the recommendation 804 for the presentation adaptation may include one or more selectable user interface controls for enabling or disabling an adaptation presentation. For example, the user of the user computing device 102 may be given the option to begin an adapted presentation. As discussed above in greater detail with respect to FIG. 5, several types of presentation adaptations are possible, and the recommendation 804 may include information on the particular presentation adaptation that is recommended. However, in some embodiments, the presentation analysis service causes the user computing device 102 to change from the original presentation to the adapted presentation automatically, without necessarily requiring input from the user.

Figure 9:
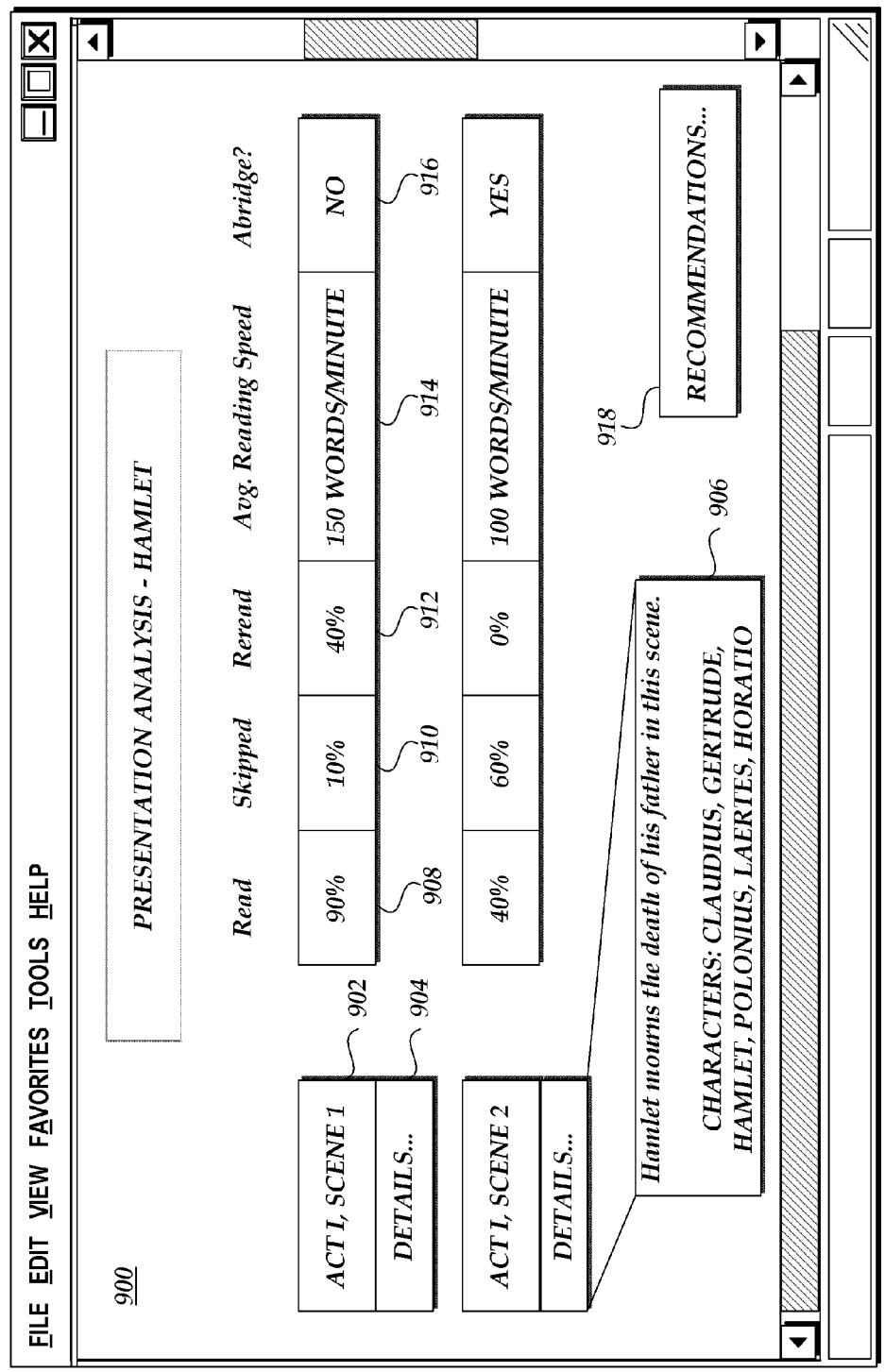
FIG. 9 is a pictorial diagram depicting an illustrative user interface that may be provided by the presentation analysis service.

Turning now to FIG. 9, an example user interface 900 for the presentation of aggregate presentation information is shown. Generally described, the user interface 900 may organize aggregate presentation information in tabular, graphical, or textual form, or in any other form. Advantageously, information may be presented in a convenient form to a provider of an item of content, which may then tailor its offerings of items of content based on the aggregate presentation information and/or any recommendations provided therewith.

As shown in the example user interface 900, aggregate presentation information may be associated with a particular portion 902 of an item of content. A selectable user interface control 904 may be provided to enable the provider to obtain more detailed information 906 about the particular portion of the item of content for which aggregate presentation position has been provided. For example, this additional information may pertain to any referents associated with the portion of the item of content (e.g., may include a list of events, moods, settings, characters, or other subject matter) and may also pertain to other associated with the portion of the item of content, substantially as discussed above with respect to FIG. 6A and FIG. 6B.

For each portion of the item of content, the user interface 900 may present aggregate presentation information pertaining to that particular portion of the item of content. For example, a portion presentation percentage 908 derived from the aggregate presentation information may be provided. This portion presentation percentage 908 may indicate a percentage of user computing devices 102 that presented the portion of the item of content from start to finish. Likewise, a skipped percentage 910 may indicate a percentage of user computing devices 102 that did not present the portion of the item of content, but did present a later portion of the item of content. Further, a re-presented percentage 912 may indicate a percentage of user computing devices 102 that presented the portion of the item of content more than once. Optionally, an indication of the average number of times that the portion of the item of content was presented may be provided in conjunction with the re-presented percentage 912. For items of interactive content for which user input is required to advance the presentation position (e.g., video games, or textual content such as electronic books, periodicals, and the like), an average presentation speed 914 may also be provided. The average presentation speed may be measured in words per minute, pages per minute, amount of time taken to complete a video game level, etc. Still other metrics for presentation speed are possible.

The user interface 900 may further include recommendations pertaining to the item of content. In some embodiments, these recommendations include recommendations to abridge an item of content by removing one or more portions originally included in the item of content. For example, if at least a threshold percentage of user computing devices 102 completed a portion of the item of content, the presentation analysis service may recommend that the portion of the item of content not be abridged, as shown by the abridgment recommendation 916. On the other hand, if at least a threshold percentage of user computing devices 102 skipped the portion of the item of content, the presentation analysis service may recommend that the portion of the item of content may be removed from an abridged version of the item of content. Advantageously, these recommendations may be used to guide the generation of abridged items of content by a provider of the item of content. For example, as audiobooks are often abridged relative to a companion electronic book, the presentation analysis service may provide a way for a provider of an electronic book to identify portions of the electronic book that should not be narrated for inclusion in the audiobook.

Further recommendations may also be provided to the provider of content, and may be displayed in response to a provider's interaction with the recommendations selectable control 918. As discussed above with respect to FIG. 4, these recommendations may include, for example, recommendations to provide items of content related to a particular referent; recommendations to provide items of content with a particular characteristic (e.g., difficulty level, level of explicit content, dialect, and the like); recommendations to cease offering items of content that users are not completing; and other recommendations, substantially as discussed above.

Certain embodiments of the presentation analysis service have been discussed above with respect to presentation positions over time of an item of content presented by one or more user computing devices 102. However, presentation information may generally include any type of information that may be relevant to the presentation of an item of content to a user. For example, presentation information may include information about a type of computing device presenting an item of content (e.g., an e-reader vs. a tablet computer vs. a laptop computer); characteristics of a computing device presenting the item of content (e.g., whether the computing device includes a backlit display, a front-lit display, or an electronic ink display); information about a user of the item of content that may be provided to the presentation analysis service (e.g., age, gender, subject matter interests, etc.); and other information. This information may also be disseminated by the presentation analysis service to users or providers of items of content.

Further, while certain embodiments of the presentation analysis service have been discussed above in a retail environment for illustrative purposes, non-retail embodiments are within the spirit of the present disclosure as well. The presentation analysis service may be employed in environments where items of content are not sold, but rather are borrowed, rented, discussed, reviewed, loaned, exchanged, auctioned, shared, donated, traded, bartered, etc. Other applications of the presentation analysis service are also possible.

Many of the operations of the presentation analysis service are sufficiently mathematically or technically complex that one or more computing devices may be necessary to carry them out. For example, accessing and displaying content pages over a network, identifying content elements in an item of dynamic content, aggregating presentation information, generating recommendations from presentation information, and other operations of the presentation analysis service effectively require resort to one or more computing devices. Additionally, a computing device may be required to present an item of digital content, as discussed above.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Conjunctive language such as the phrase "at least one of X, Y and Z" □ unless specifically stated otherwise, is otherwise understood with the context as used in general to convey that an item, term, etc. may be either X, Y, or Z, or a combination thereof. Thus, such conjunctive language is not generally intended to imply that certain embodiments require at least one of X, at least one of Y and at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted or executed out of order from that shown or discussed, including substantially concurrently or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system for presentation analysis, the system comprising:
    a computing device configured to:
        obtain, from each user computing device of a plurality of user computing devices, presentation information indicating which of a plurality of portions of an electronic book have been presented by the user computing device, and further indicating, for each portion of the plurality of portions, a timing of presentation of each portion by the user computing device;
        aggregate the presentation information from each user computing device to generate aggregate presentation information;
        determine, from the aggregate presentation information, a presentation metric for each portion of the plurality of portions, wherein the presentation metric provides information relating to a timing of presentation of each portion of the electronic book on each of the plurality of user computing devices;
        identify at least one portion of the plurality of portions of the electronic book that is associated with a presentation metric that satisfies a threshold value;
        generate a recommendation pertaining to the at least one portion of the electronic book that is associated with the presentation metric that satisfies the threshold value; and
        provide the recommendation to a provider of the electronic book; and
    an electronic data store in communication with the computing device, wherein the electronic data store is configured to store the aggregate presentation information.

2. The system of claim 1, wherein the recommendation comprises a recommendation to abridge the at least one portion of the electronic book.

3. The system of claim 1, wherein:
the at least one portion of the electronic book comprises a referent; and
the recommendation comprises a recommendation to provide another item of content pertaining to the referent.

4. The system of claim 3, wherein the referent comprises at least one of a character, event, setting, or mood.

5. The system of claim 1, wherein the computing device is further configured to cause a graphical display of the aggregate presentation information.

6. A computer-implemented method for presentation analysis, the computer-implemented method comprising:
as implemented by one or more computing devices configured with specific computer-executable instructions,
obtaining, from each user computing device of a plurality of user computing devices, presentation information for an item of content, the presentation information indicating one or more positions within the item of content and a timing of presentation of each of the one or more positions by the user computing device;
aggregating the presentation information from each user computing device to generate aggregate presentation information;
determining, from the aggregate presentation information, a presentation metric for each portion of a plurality of portions of the item of content, wherein the presentation metric provides information relating to a timing of presentation of each portion of the item of content on each of the plurality of user computing devices;
identifying at least one portion of the plurality of portions of the item of content that is associated with a presentation metric that satisfies a threshold value;
generating a recommendation pertaining to the at least one portion of the item of content that is associated with the presentation metric that satisfies the threshold value; and
providing the recommendation to a provider of the item of content.

7. The computer-implemented method of claim 6, wherein the aggregate presentation information indicates how many of the plurality of user computing devices did not present the at least one portion of the item of content.

8. The computer-implemented method of claim 7 further comprising determining that at least a threshold percentage of the plurality of user computing devices did not present the at least one portion of the item of content, wherein the recommendation comprises a recommendation to generate an abridged item of content that does not include the at least one portion of the item of content.

9. The computer-implemented method of claim 8, wherein:
the item of content is embodied in a first medium;
the recommendation to generate the abridged item of content further comprises a recommendation to generate the abridged item of content in a second medium; and
the first medium and the second medium are different media.

10. The computer-implemented method of claim 9, wherein the first medium is a medium that comprises textual content and the second medium is a medium that comprises audio content.

11. The computer-implemented method of claim 6, wherein the aggregate presentation information indicates how many of the plurality of user computing devices presented the at least one portion of the item of content more than once.

12. The computer-implemented method of claim 11 further comprising identifying a referent present in the at least one portion of the item of content, wherein the recommendation comprises a recommendation to provide another item of content pertaining to the referent.

13. The computer-implemented method of claim 6, wherein the at least one portion of the item of content is identified based at least in part on user input.

14. The computer-implemented method of claim 6, wherein the at least one portion of the item of content is identified automatically.

15. The computer-implemented method of claim 6, wherein the item of content comprises an electronic book.

16. The computer-implemented method of claim 15, wherein:
the aggregate presentation information comprises an average reading time associated with the electronic book; and
the recommendation includes an indication of the average reading time associated with the electronic book.

17. The computer-implemented method of claim 16 further comprising providing the recommendation to a user computing device.

18. A non-transitory computer-readable medium having a computer-executable module that, when executed by a computing system, causes the computing system to:
determine presentation information associated with a presentation of a first item of content by a user computing device, wherein the presentation information indicates one or more positions within the first item of content and a timing of presentation of each of the one or more positions by the user computing device;
determine, from the presentation information, a presentation metric for each portion of a plurality of portions of the first item of content, wherein the presentation metric provides information relating to a timing of presentation of each portion of the item of content on the user computing device;
identify at least one portion of the plurality of portions of the first item of content that is associated with a presentation metric that satisfies a threshold value;
identify a second item of content associated with the at least one portion of the first item of content;
generate a recommendation pertaining to the second item of content; and
output the recommendation for presentation to a user of the user computing device.

19. The non-transitory computer-readable medium of claim 18, wherein the presentation information indicates that the at least one portion of the first item of content was presented more than once by the user computing device.

20. The non-transitory computer-readable medium of claim 19, wherein:
the computer-executable module further causes the computing system to identify a referent in the at least one portion of the first item of content; and
the second item of content comprises the referent.

21. The non-transitory computer-readable medium of claim 19, wherein the computer-executable module further causes the computing system to:
determine a difficulty level of the at least one portion of the first item of content;

determine a difficulty level of the second item of content; and wherein the second item of content has a lower difficulty level than the at least one portion of the first item of content.

22. The non-transitory computer-readable medium of claim 18, wherein:
the computer-executable module is further configured to obtain aggregate presentation information pertaining to the second item of content; and
the aggregate presentation information pertaining to the second item of content indicates that a least a threshold percentage of users of the second item of content completed the second item of content.

23. The non-transitory computer-readable medium of claim 18, wherein the presentation information indicates that at least a threshold percentage of the first item of content was presented by the user computing device.

24. The non-transitory computer-readable medium of claim 23, wherein:
the computer-executable module further causes the computing system to obtain aggregate presentation information pertaining to the first item of content and the second item of content; and
the aggregate presentation information indicates that at least a threshold percentage of users who completed the first item of content also completed the second item of content.

25. The non-transitory computer-readable medium of claim 18, wherein the first item of content and the second item of content are companion items of content.

26. A system for presentation analysis, the system comprising:
an electronic data store configured to store a first item of content; and
a computing device in communication with the electronic data store, the computing device configured to:
provide a presentation of the first item of content;
determine presentation information indicating one or more positions within the first item of content output by the computing device, and a timing of presentation of each of the one or more positions by the user computing device;
determine, from the presentation information, a presentation metric for each portion of a plurality of portions of the first item of content, wherein the presentation metric provides information relating to a timing of presentation of each portion of the item of content on the user computing device;
identify at least one portion of the plurality of portions of the first item of content that is associated with a presentation metric that satisfies a threshold value;
generate a recommendation pertaining to the at least one portion of the first item of content that is associated with the presentation metric that satisfies the threshold value; and
output the recommendation for presentation to a user.

27. The system of claim 26, wherein the recommendation pertains to a second item of content associated with the at least one portion of the first item of content.

28. The system of claim 27, wherein the computing device is further configured to determine that the at least one portion of the first item of content includes coarse language, and wherein the second item of content does not include coarse language.

29. The system of claim 27, wherein:
the electronic data store is further configured to store presentation information pertaining to a third item of content; and
the recommendation pertaining to the second item of content is further based at least in part on the presentation information pertaining to the third item of content.

30. The system of claim 26, wherein:
the presentation information indicates that presentation was provided for a percentage of the first item of content; and
the percentage for which the presentation was provided does not satisfy a threshold percentage.

31. The system of claim 30, wherein:
the recommendation indicates that a user of the first item of content may obtain an allocation of a credit; and
the computing device is further configured to obtain the allocation of the credit.

32. The system of claim 1, wherein the timing of presentation of each portion of the electronic book indicates at least one portion of the electronic book that was not output by the user computing device.

33. The system of claim 1, wherein the timing of presentation of individual portions of the electronic book indicates at least one of a time period in which the individual portion was output by a user computing device, a percentage of the individual portion output by a user computing device, a number of times the individual portion was output by a user computing device, or a speed at which the individual portion was output on by a user computing device.

34. The system of claim 1, wherein the presentation metric identifies at least one of a percentage of the plurality of user computing devices that output the entirety of the at least one portion, a percentage of the plurality of user computing devices that did not output any of the at least one portion, a percentage of the plurality of user computing devices that output the at least one portion multiple times, an average speed at which the at least one portion was output by the plurality of user computing devices, or an average length of presentation session during output of the at least one portion by the plurality of user computing devices.

* * * * *

UNITED STATES PATENT AND TRADEMARK OFFICE
CERTIFICATE OF CORRECTION

PATENT NO. : 9,223,830 B1
APPLICATION NO. : 13/662306
DATED : December 29, 2015
INVENTOR(S) : Steven Charles Dzik It is certified that error appears in the above-identified patent and that said Letters Patent is hereby corrected as shown below:

Title page

In column 2 (page 2, item 56) at line 68, Under Other Publications, before "Japanese" insert --in--.

Signed and Sealed this
Twenty-eighth Day of June, 2016

Michelle K. Lee
*Director of the United States Patent and Trademark Office*